US009756043B2

(12) United States Patent
Itoh et al.

(10) Patent No.: US 9,756,043 B2
(45) Date of Patent: Sep. 5, 2017

(54) TERMINAL APPARATUS, PROGRAM, AND COMMUNICATION SYSTEM

(71) Applicant: SONY CORPORATION, Tokyo (JP)

(72) Inventors: Katsutoshi Itoh, Tokyo (JP); Tadashi Ehara, Kanagawa (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 14/760,001

(22) PCT Filed: Nov. 28, 2013

(86) PCT No.: PCT/JP2013/007013
§ 371 (c)(1),
(2) Date: Jul. 9, 2015

(87) PCT Pub. No.: WO2014/115211
PCT Pub. Date: Jul. 31, 2014

(65) Prior Publication Data
US 2015/0358815 A1  Dec. 10, 2015

(30) Foreign Application Priority Data
Jan. 25, 2013  (JP) .................... 2013-012108

(51) Int. Cl.
*H04W 4/00* (2009.01)
*H04L 29/06* (2006.01)
(Continued)

(52) U.S. Cl.
CPC ......... *H04L 63/0853* (2013.01); *H04W 12/06* (2013.01); *H04W 52/0274* (2013.01); *H04W 84/12* (2013.01); *Y02B 60/50* (2013.01)

(58) Field of Classification Search
CPC .......... H04L 63/0853; H04W 52/0274; H04W 12/06; H04W 84/12
See application file for complete search history.

(56) References Cited

U.S. PATENT DOCUMENTS

2004/0162105 A1  8/2004  Reddy et al.
2006/0052085 A1  3/2006  Gregrio Rodriguez et al.
(Continued)

FOREIGN PATENT DOCUMENTS

DE  10341873 A1  4/2005
EP  1519603 A1  3/2005
(Continued)

*Primary Examiner* — Robert Wilson
(74) *Attorney, Agent, or Firm* — Chip Law Group

(57) ABSTRACT

Authentication information comprising mobile subscriber information of a mobile communication terminal may be communicated to a server, and one or more devices may further communicate with the server to perform an authentication procedure to enable a wireless LAN communication terminal separate from the mobile communication terminal to connect to a network via wireless LAN communication with an access point separate from the mobile communication terminal. In some embodiments, a mobile communication terminal may communicate authentication information comprising mobile subscriber information to a wireless LAN communication terminal separate from the mobile communication terminal and/or a wireless LAN communication terminal may receive authentication information comprising mobile subscriber information from a mobile communication terminal.

27 Claims, 23 Drawing Sheets

(51) Int. Cl.
*H04W 12/06* (2009.01)
*H04W 52/02* (2009.01)
*H04W 84/12* (2009.01)

(56) References Cited

U.S. PATENT DOCUMENTS

| | | | | |
|---|---|---|---|---|
| 2006/0293028 | A1* | 12/2006 | Gadamsetty | H04L 63/08 |
| | | | | 455/411 |
| 2010/0064346 | A1* | 3/2010 | Falk | H04W 12/06 |
| | | | | 726/3 |
| 2011/0055900 | A1* | 3/2011 | Chua | H04L 63/08 |
| | | | | 726/4 |
| 2011/0096726 | A1* | 4/2011 | Schlack | H04W 72/0453 |
| | | | | 370/328 |
| 2011/0145445 | A1 | 6/2011 | Malamant et al. | |
| 2012/0190339 | A1* | 7/2012 | Abe | H04W 48/16 |
| | | | | 455/411 |
| 2012/0239950 | A1* | 9/2012 | Davis | H04W 12/06 |
| | | | | 713/320 |
| 2014/0179338 | A1* | 6/2014 | Shang | H04W 4/023 |
| | | | | 455/456.1 |
| 2015/0358815 | A1* | 12/2015 | Itoh | H04L 63/0853 |
| | | | | 370/329 |
| 2016/0234687 | A1* | 8/2016 | Dai | H04W 12/06 |

FOREIGN PATENT DOCUMENTS

| | | |
|---|---|---|
| EP | 1742410 A1 | 1/2007 |
| JP | 2011-182335 A | 9/2011 |

\* cited by examiner

[Fig. 1]
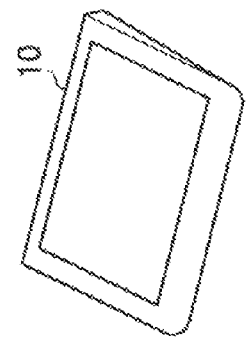
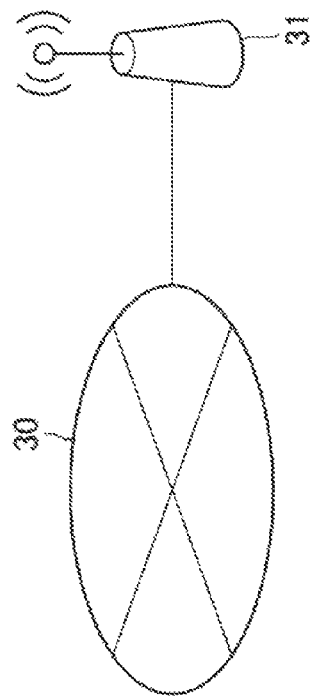

[Fig. 2]
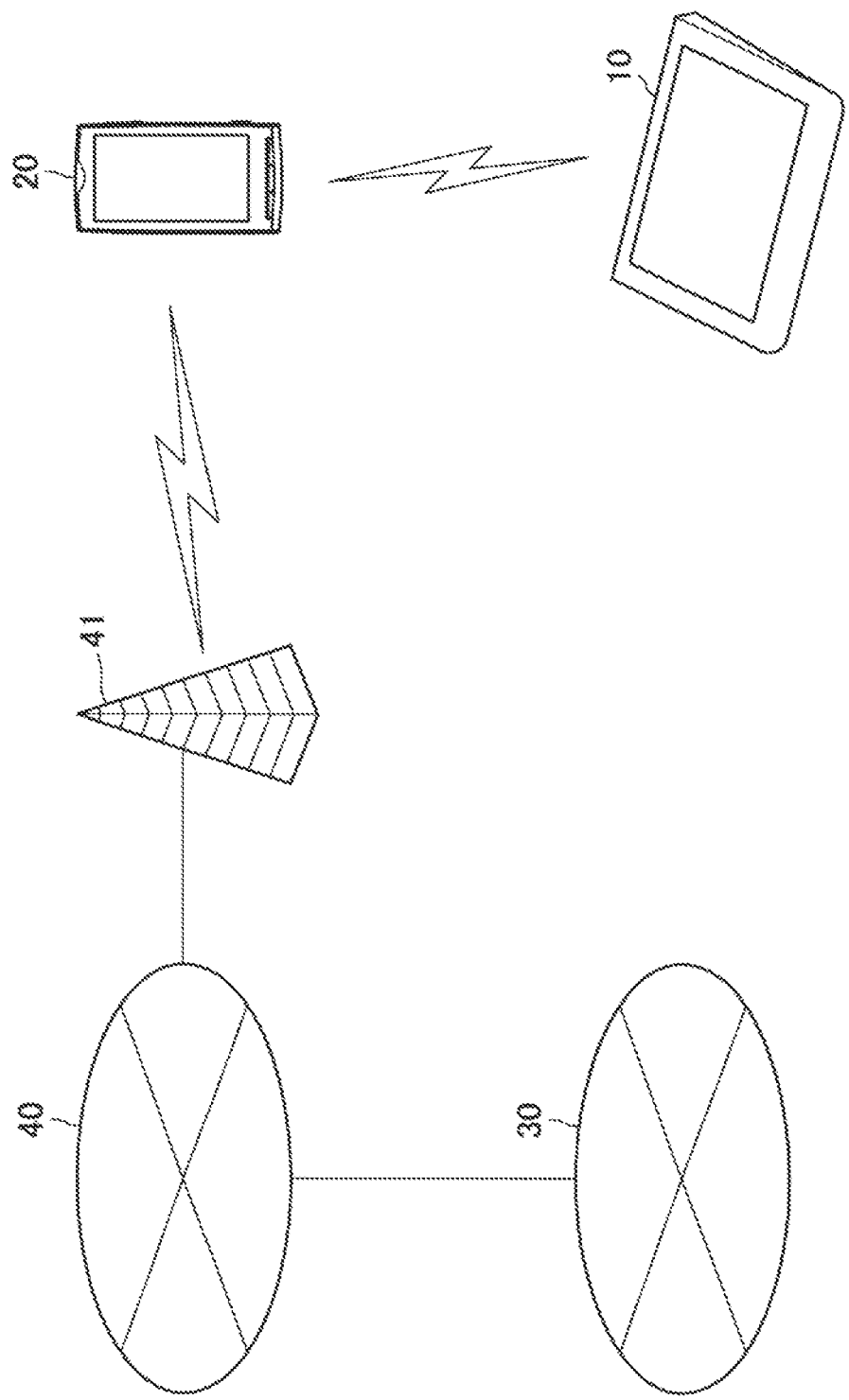

[Fig. 3]
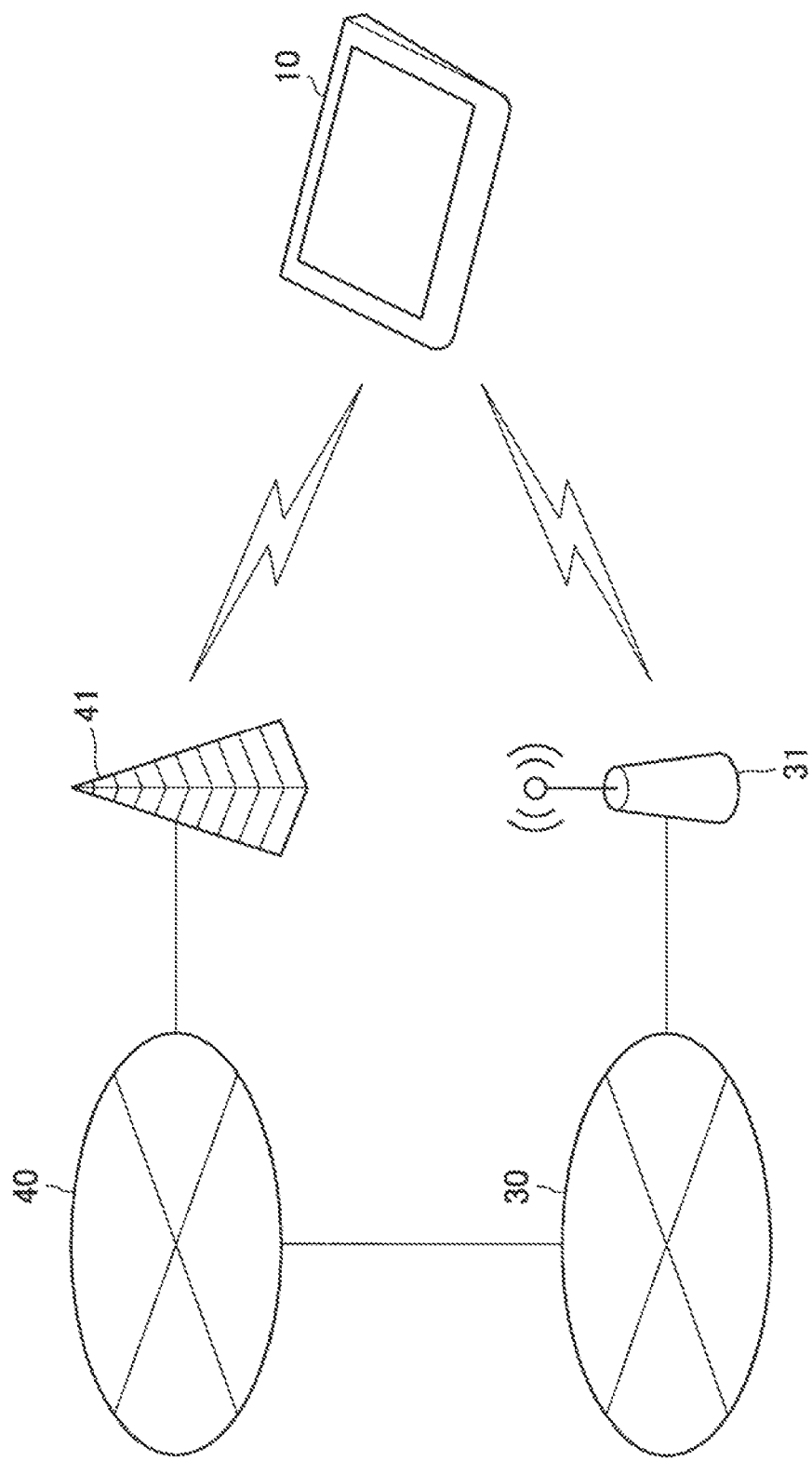

[Fig. 4]
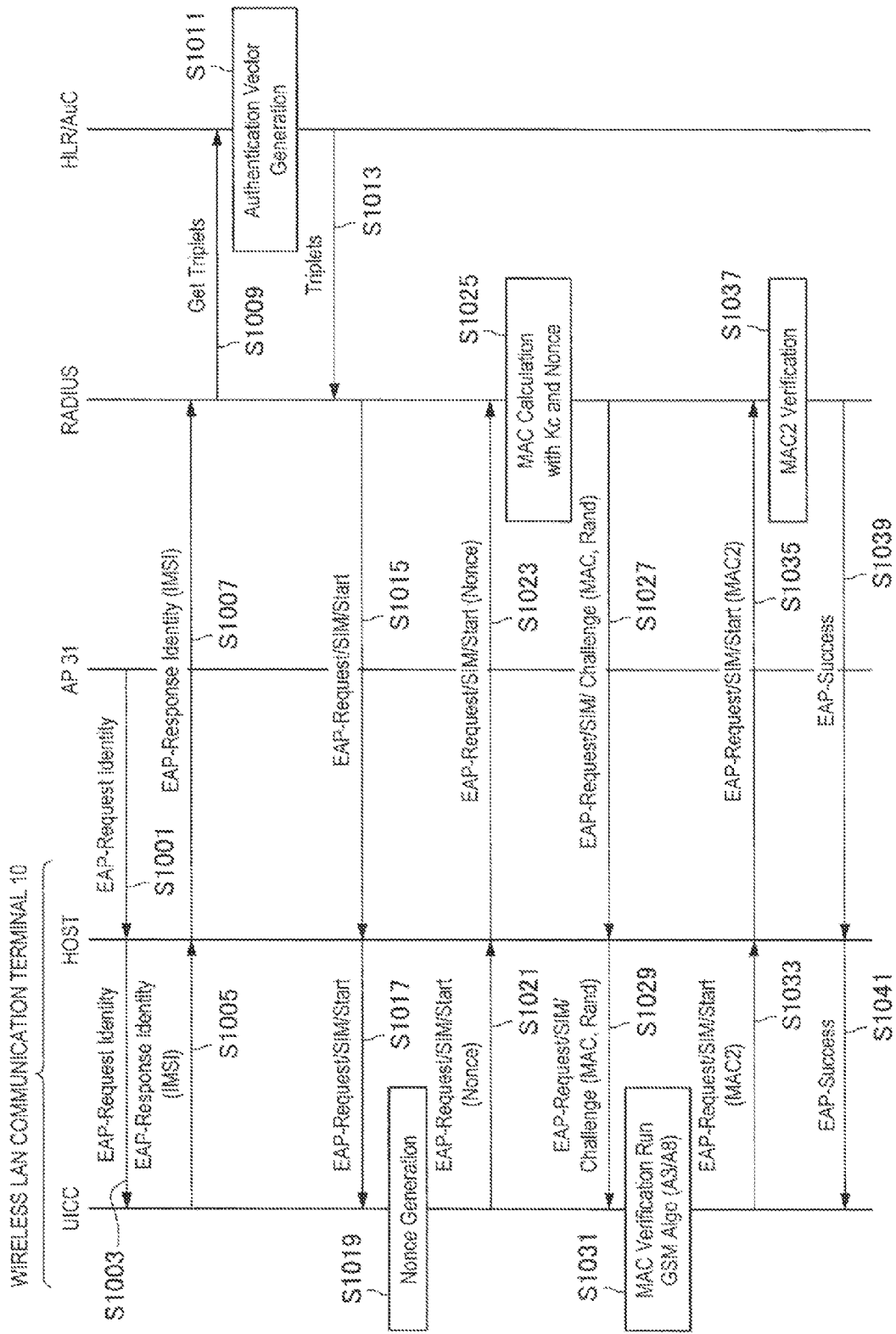

[Fig. 5]
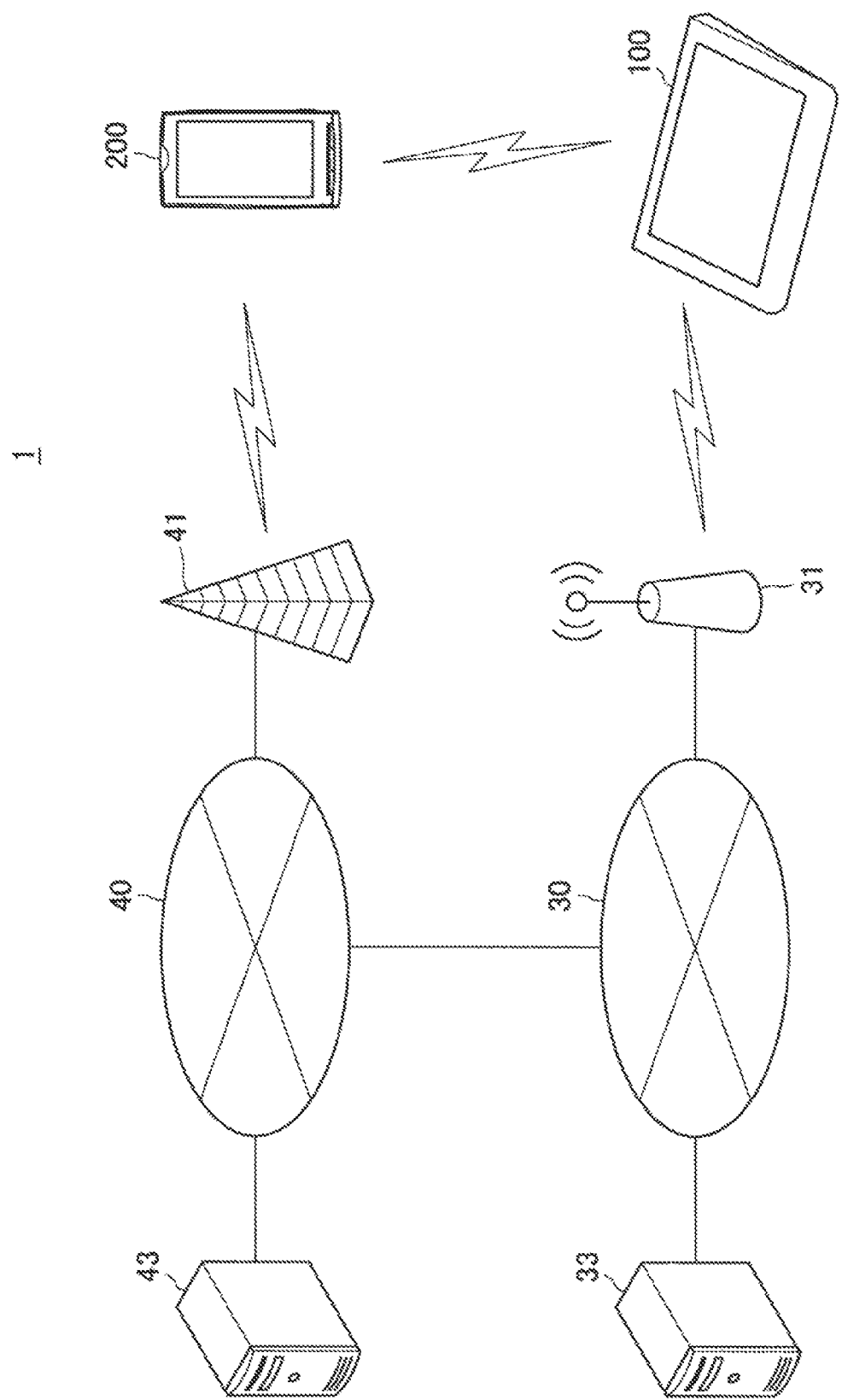

[Fig. 6]
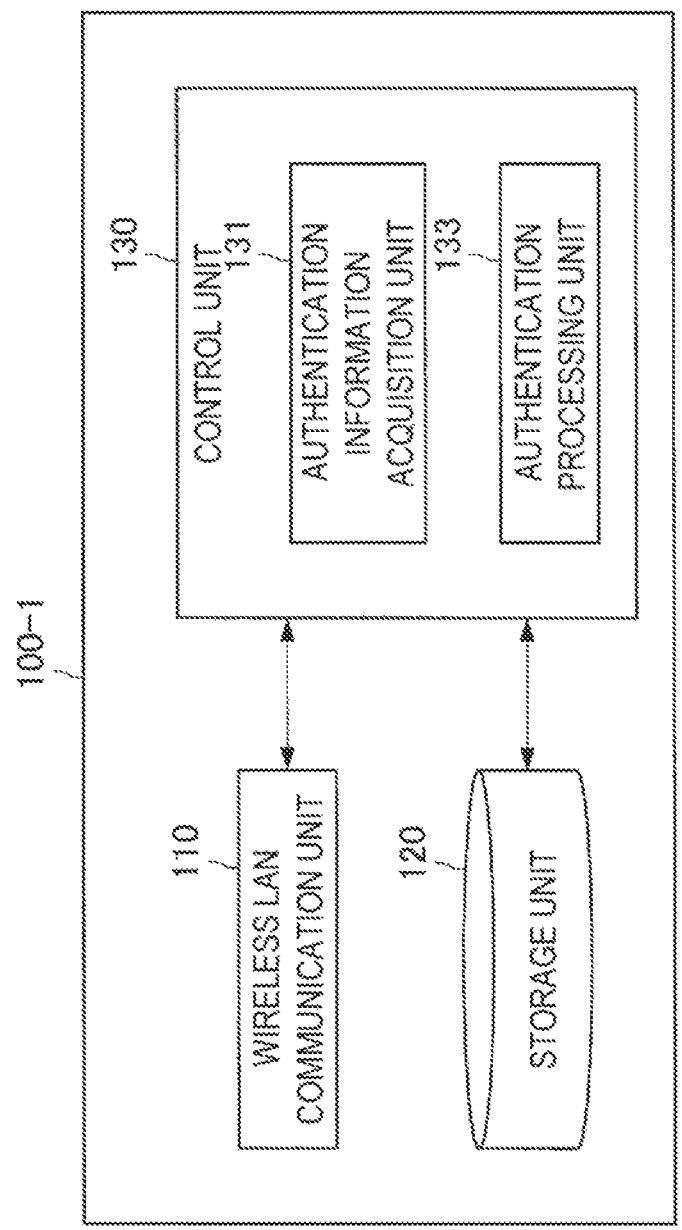

[Fig. 7]
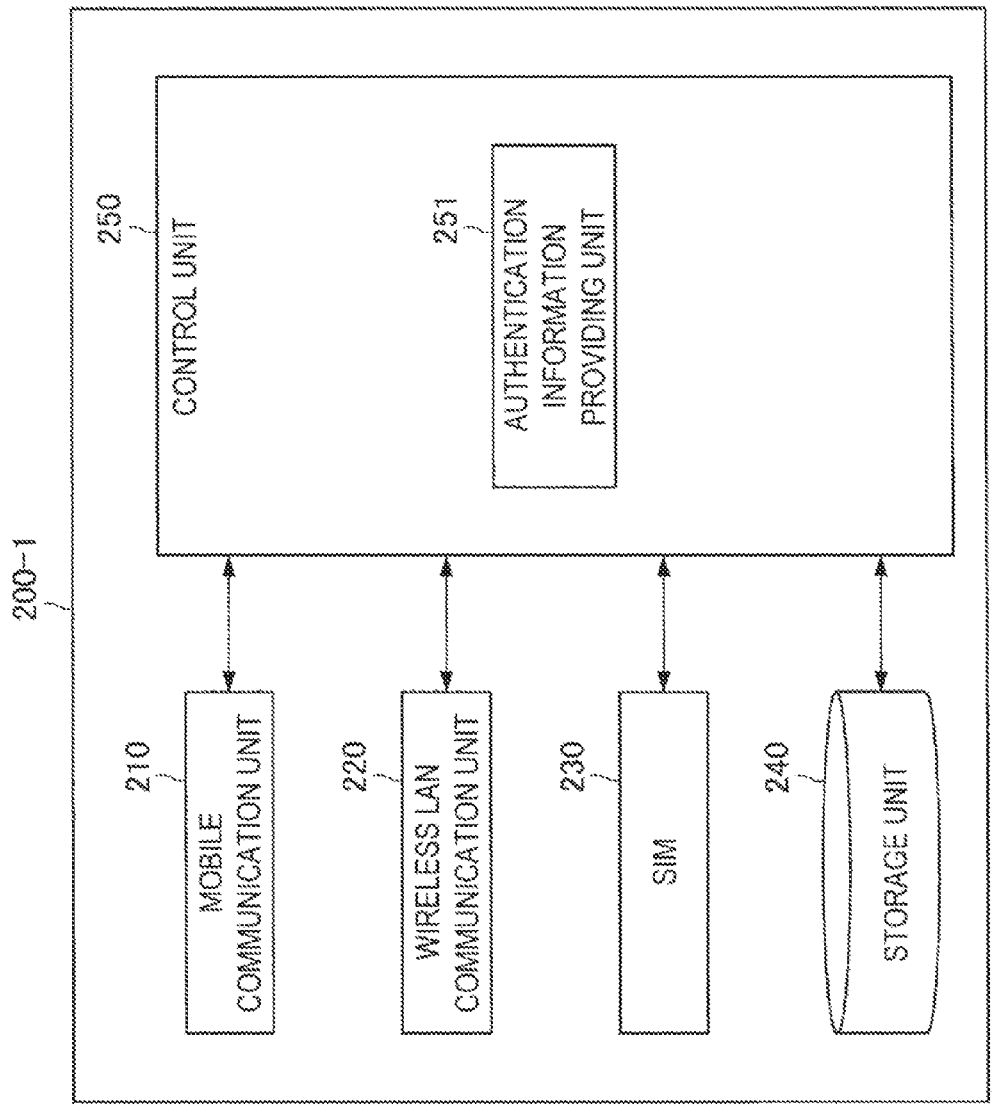

[Fig. 8]
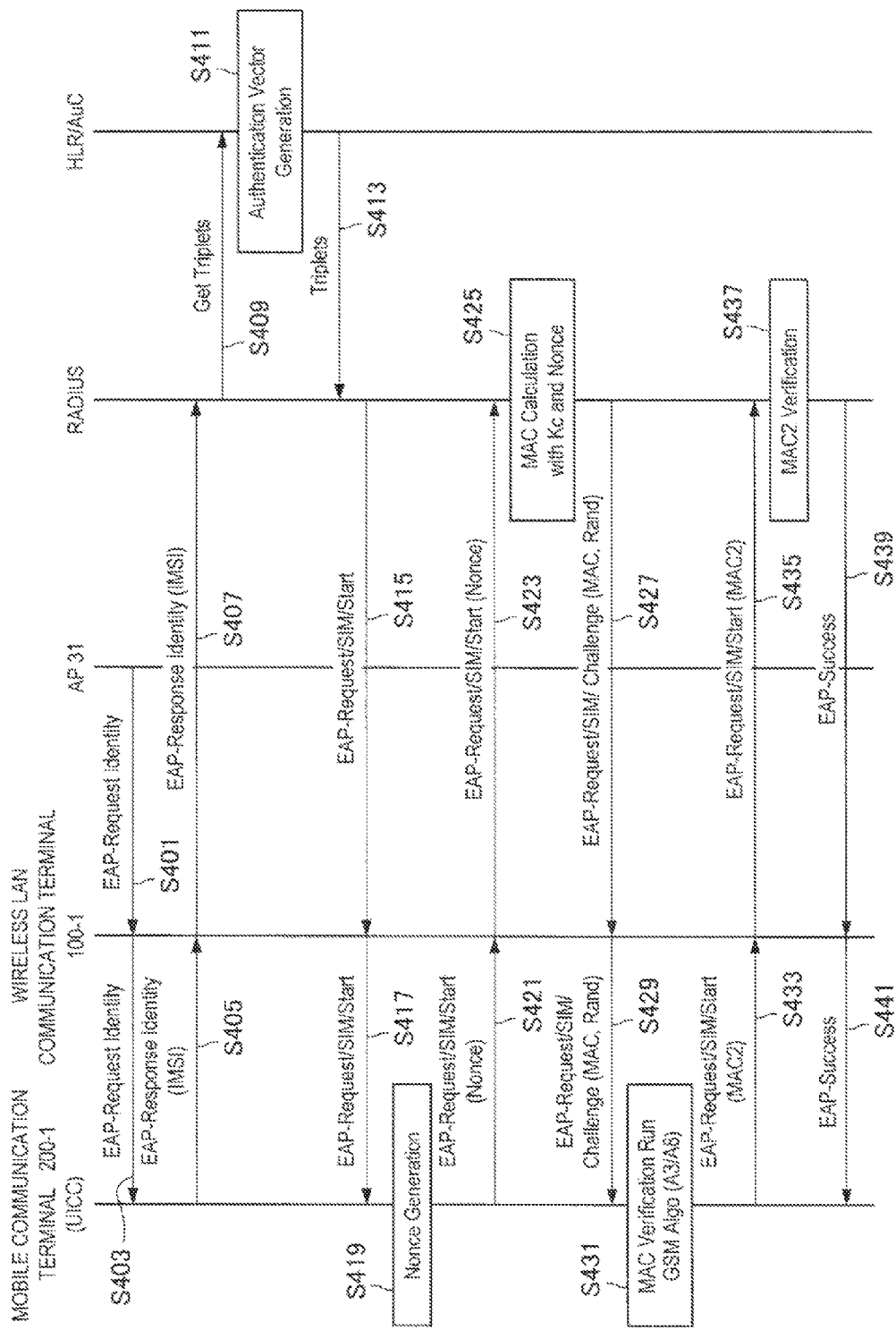

[Fig. 9]
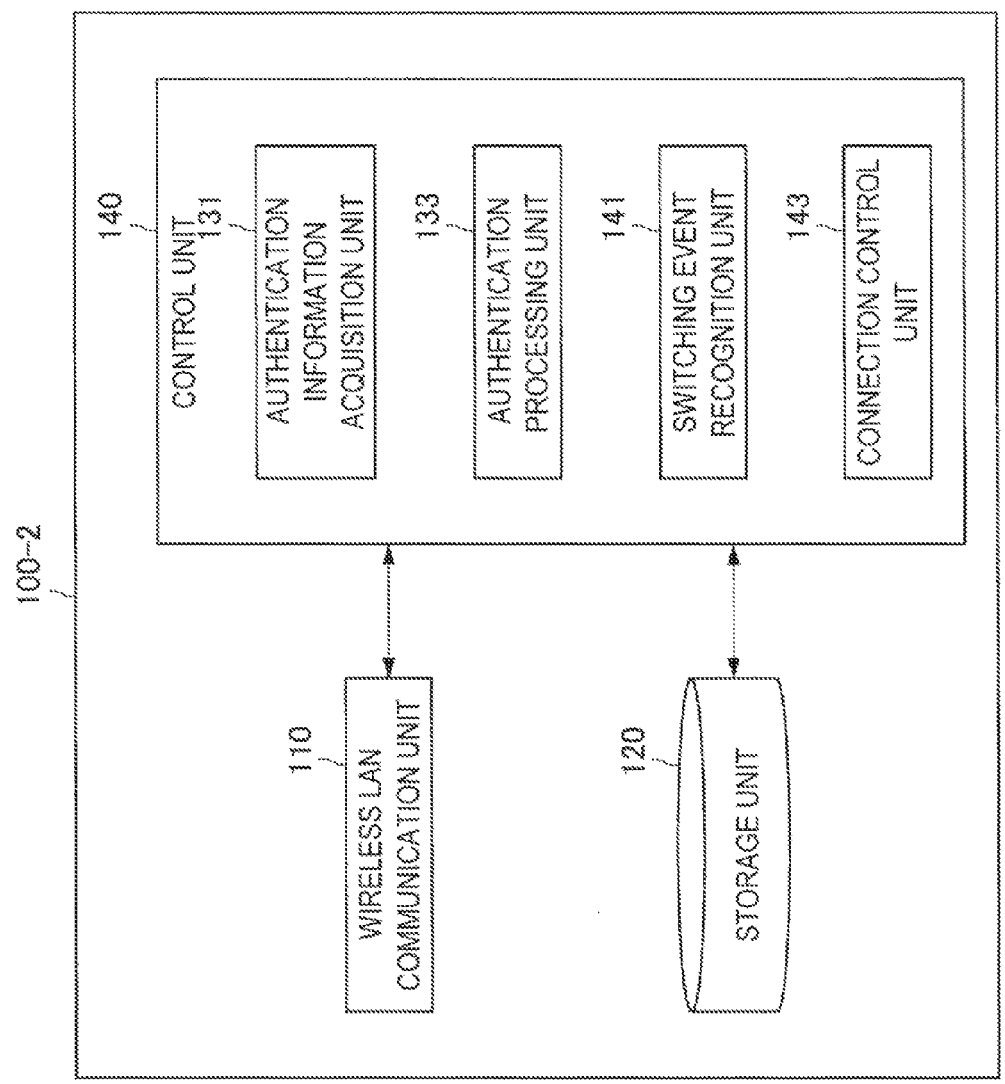

[Fig. 10]
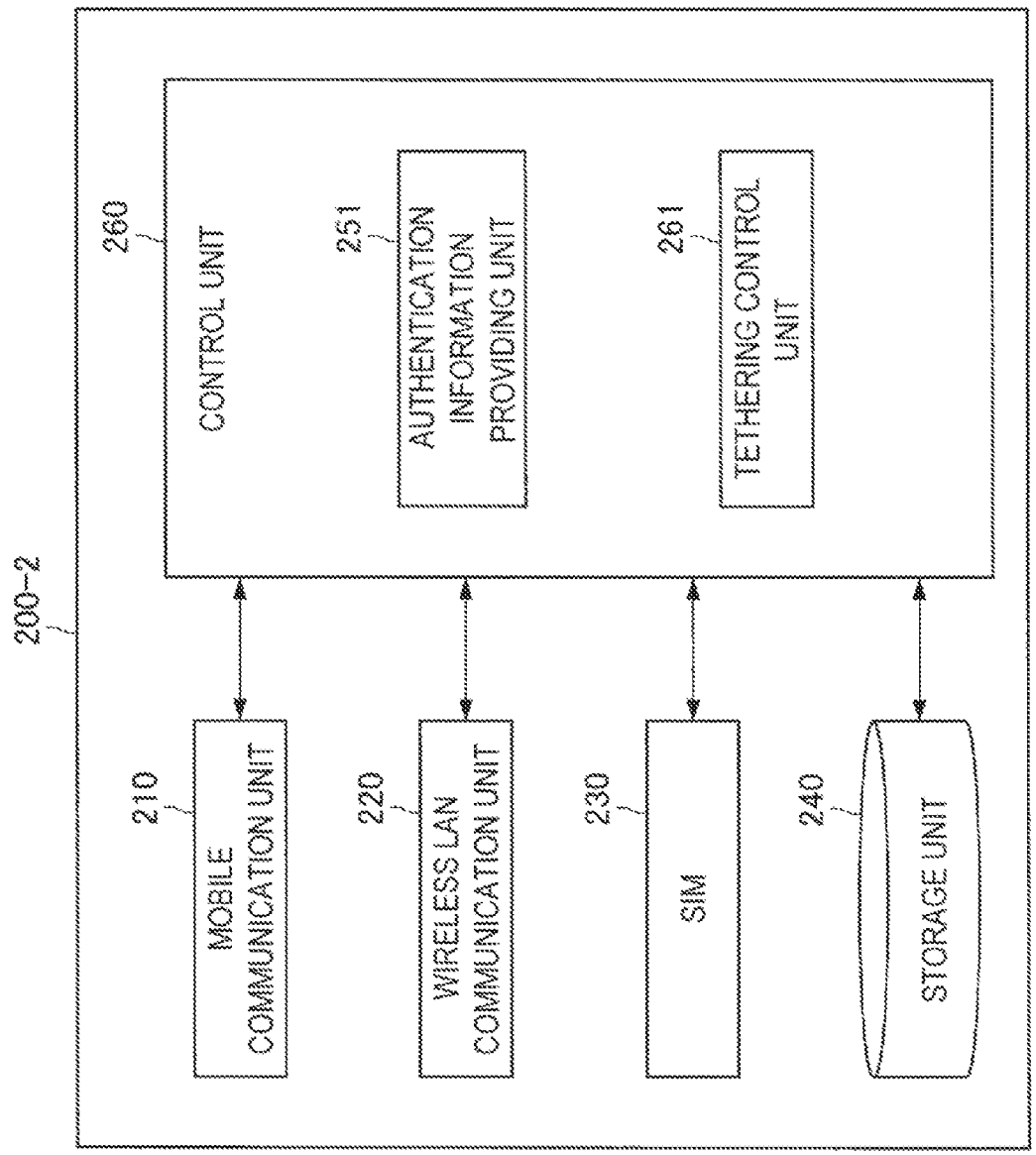

[Fig. 11]
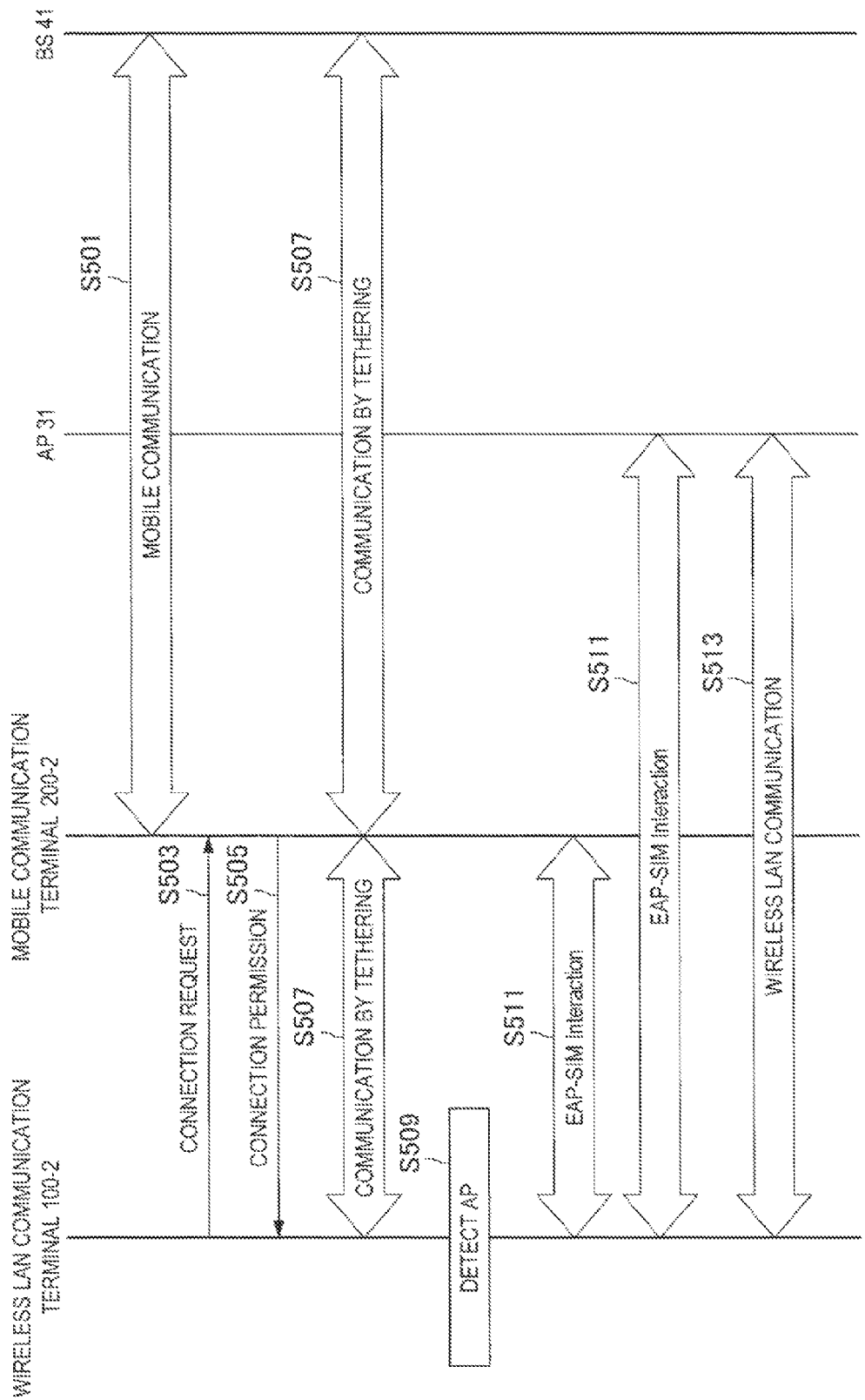

[Fig. 12]
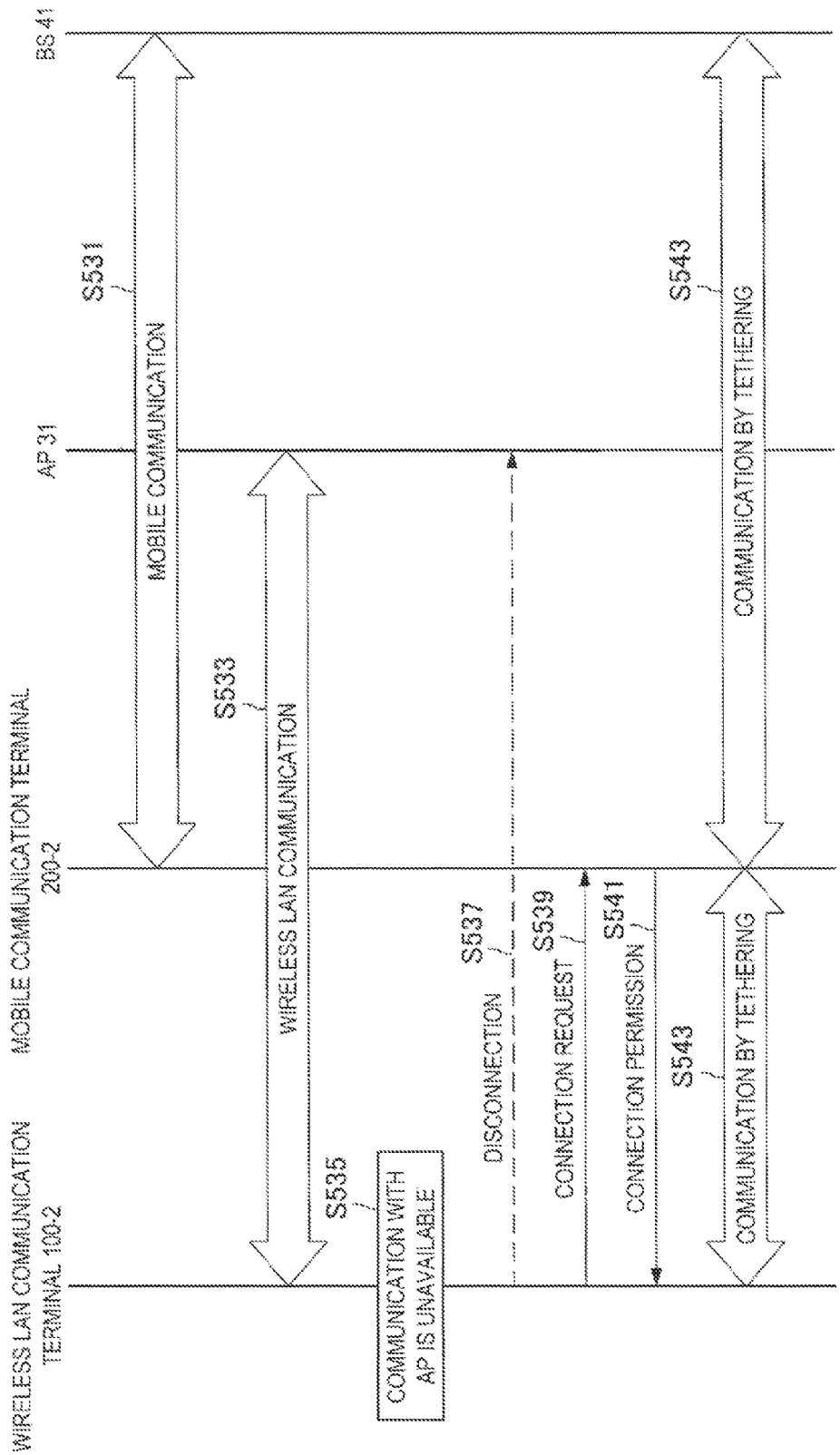

[Fig. 13]
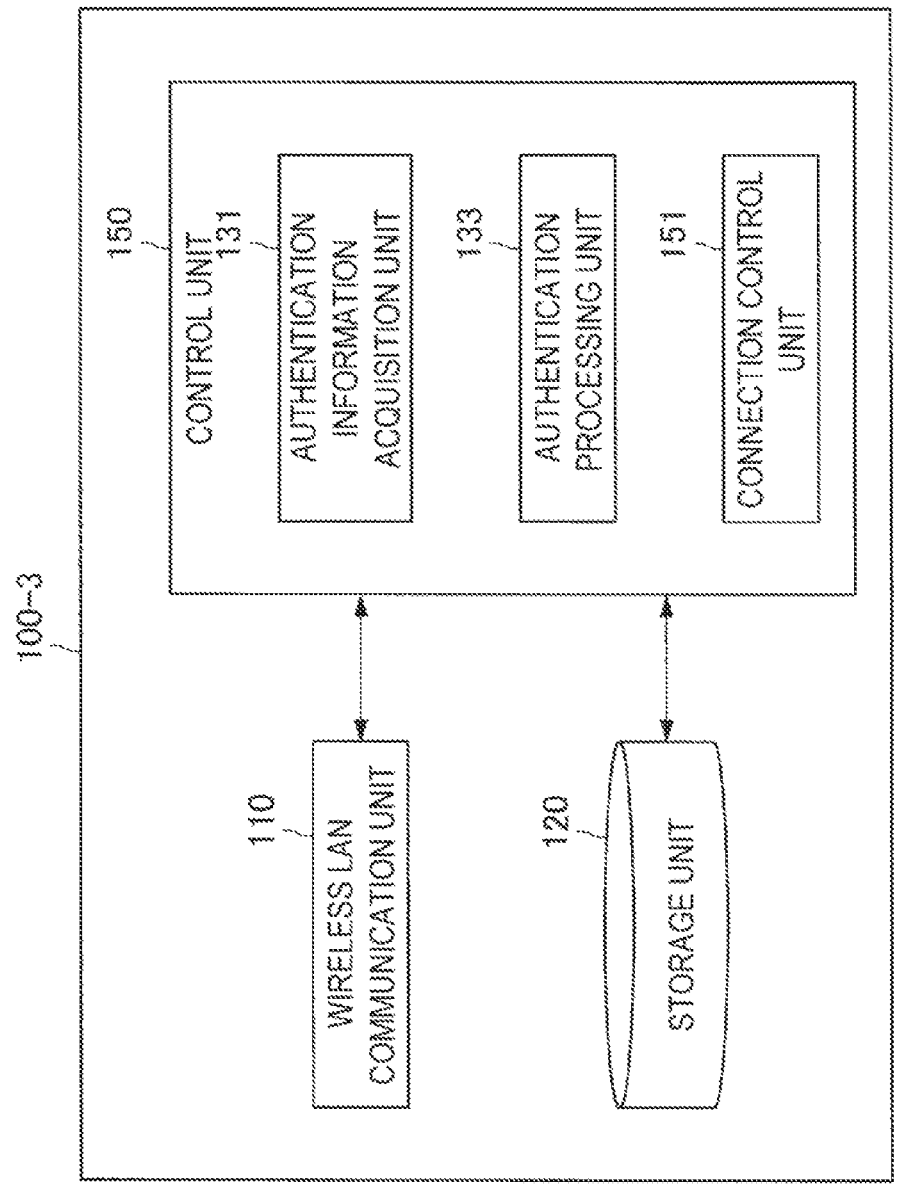

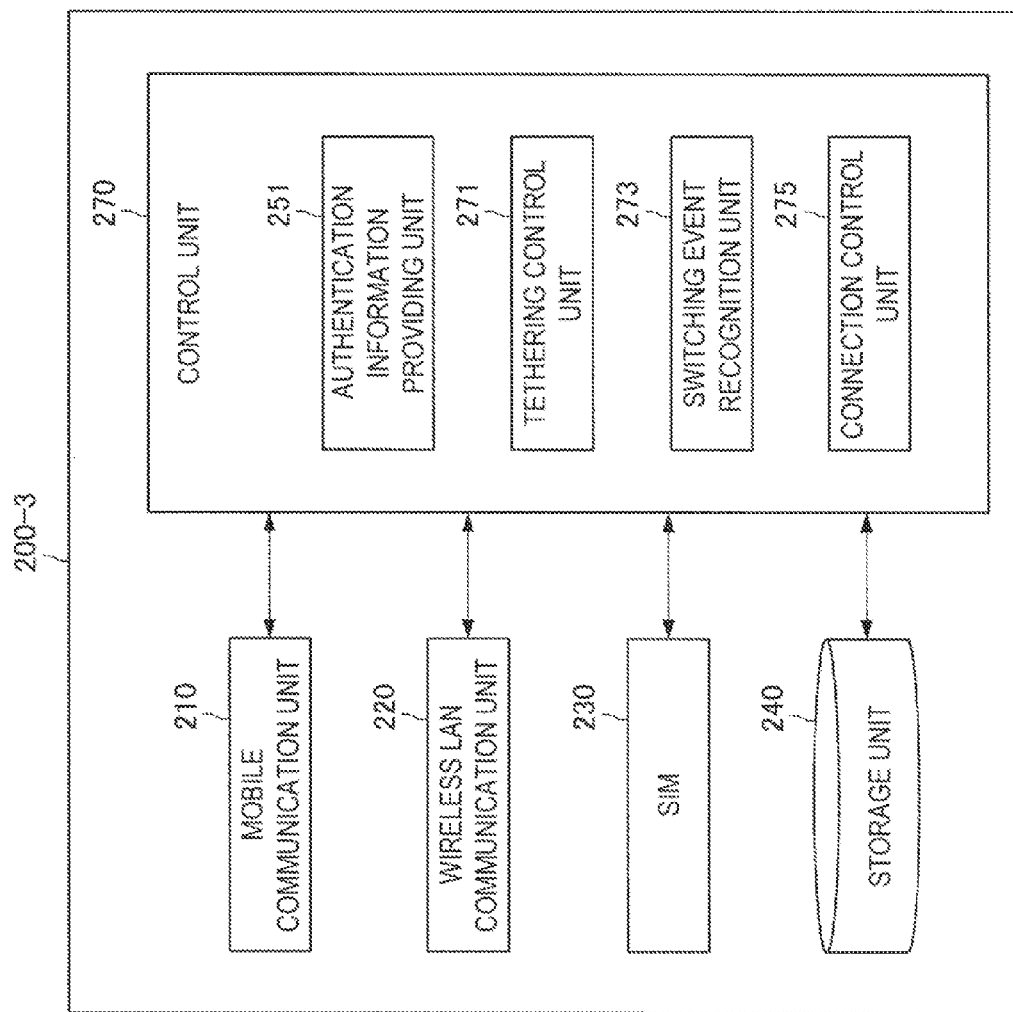
[Fig. 14]

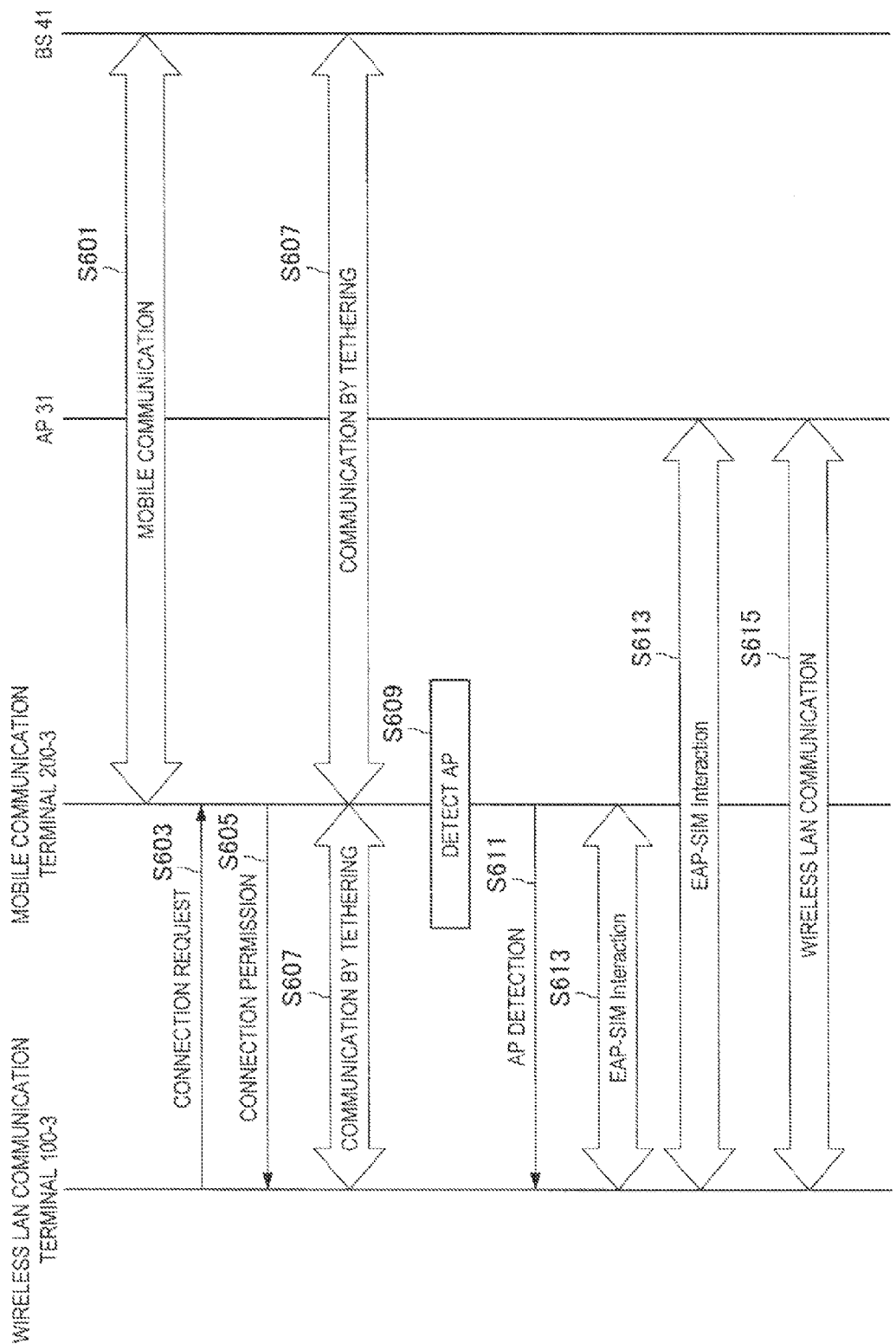
[Fig. 15]

[Fig. 16]
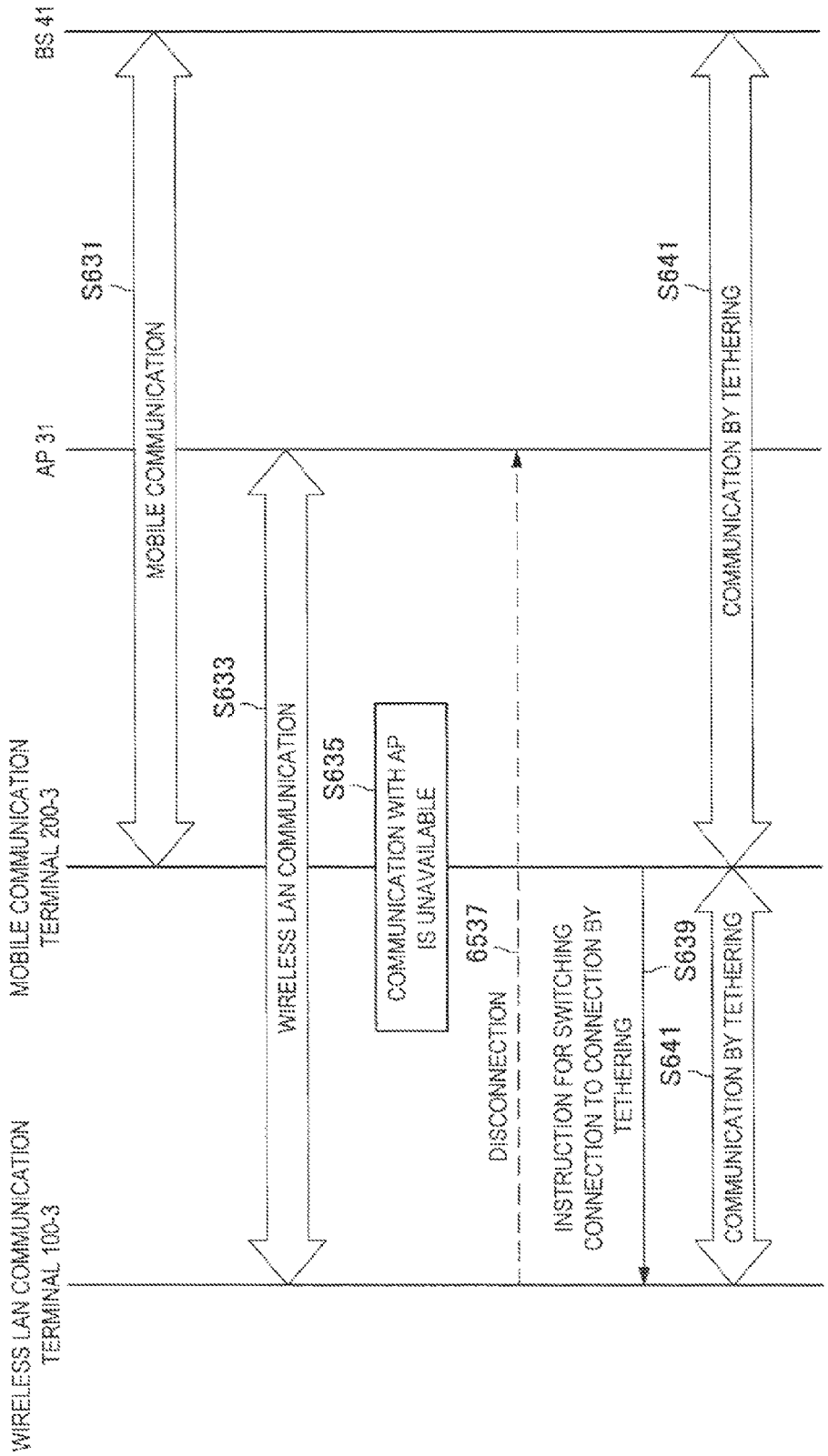

[Fig. 17]
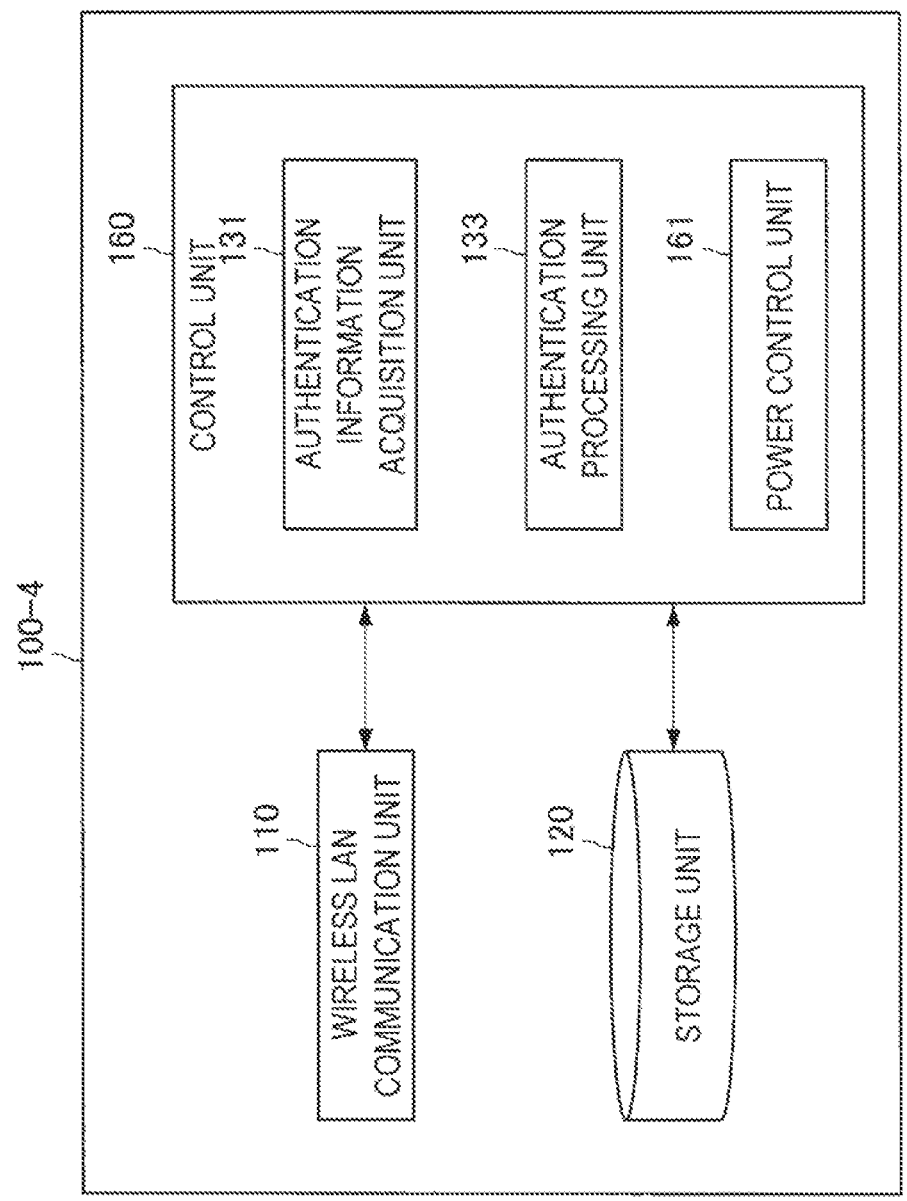

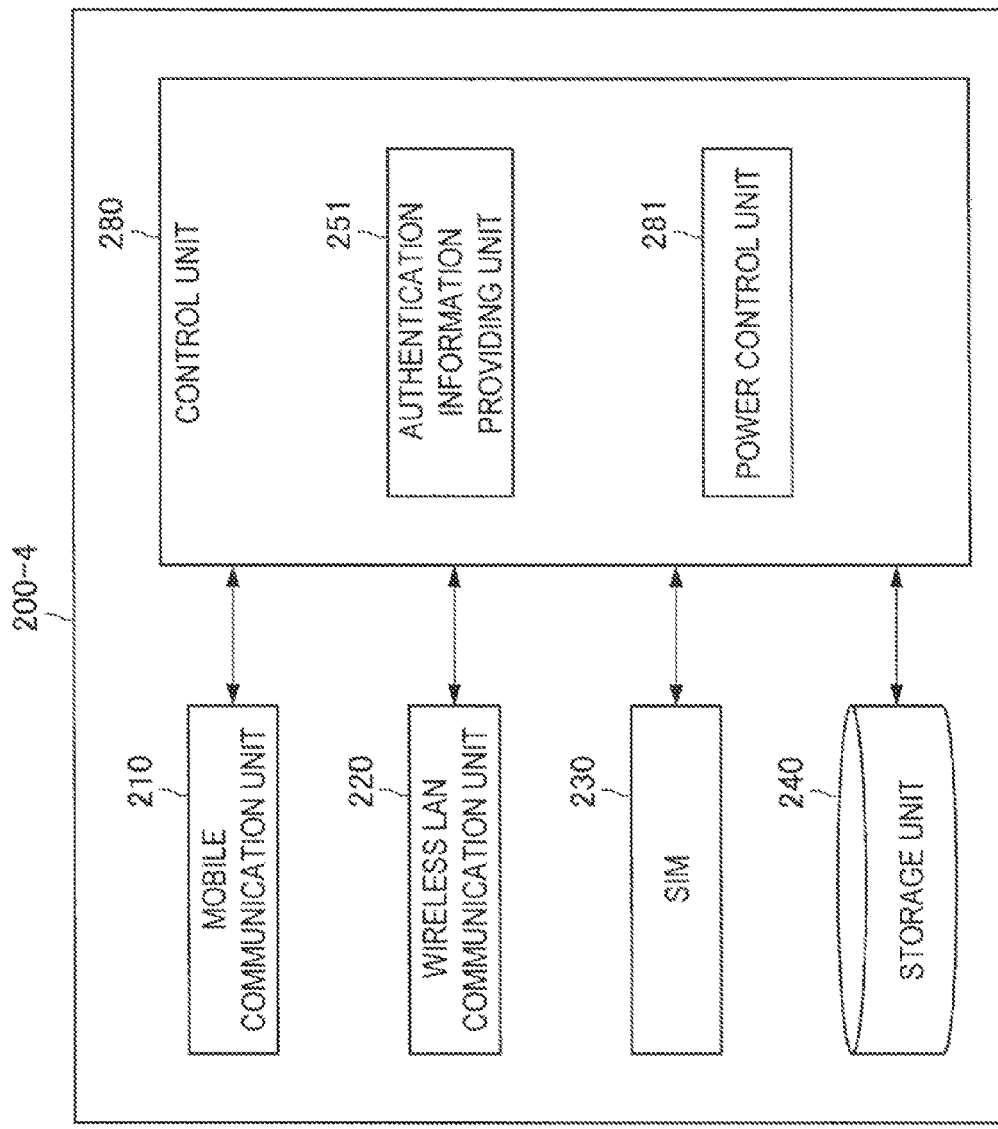
[Fig. 18]

[Fig. 19]
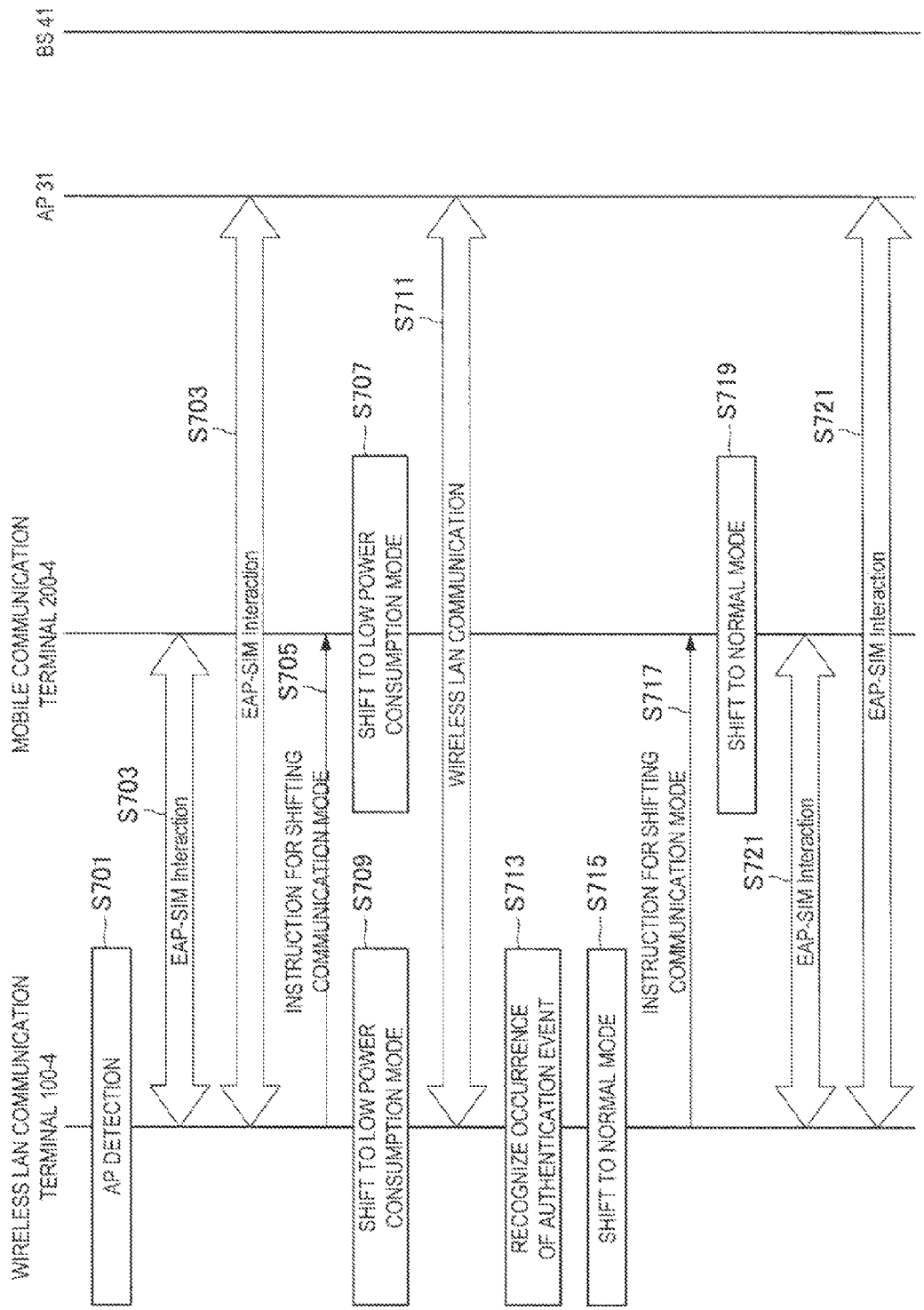

[Fig. 20]
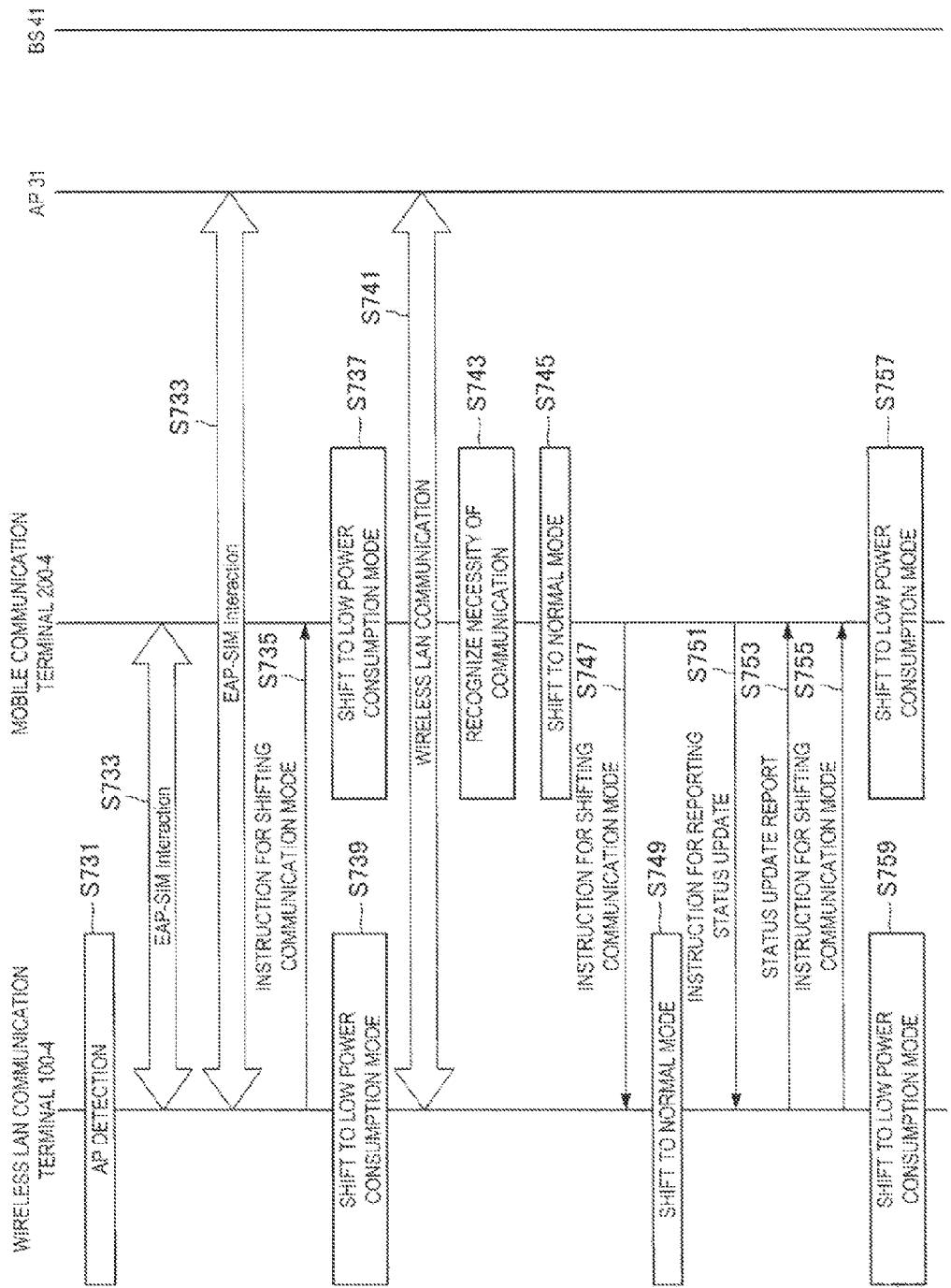

[Fig. 21]
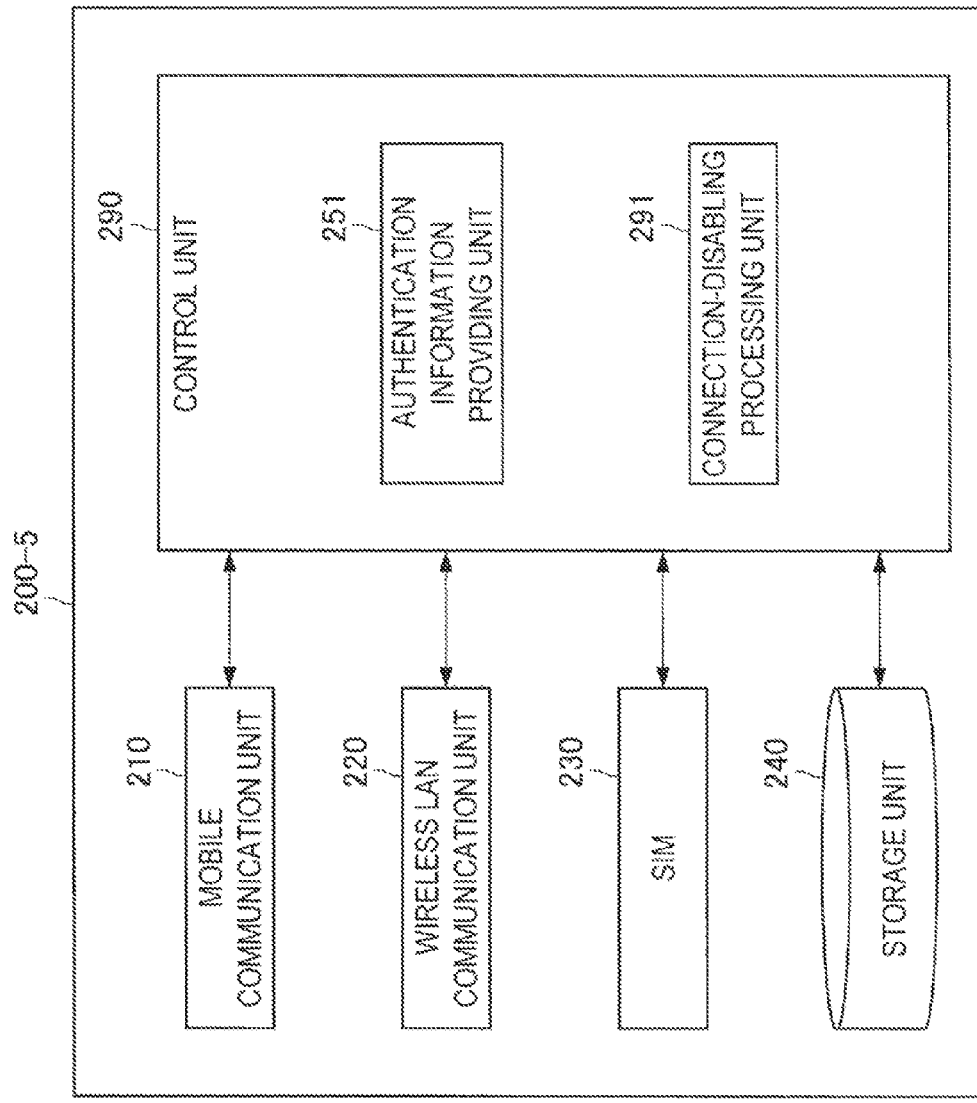

[Fig. 22]
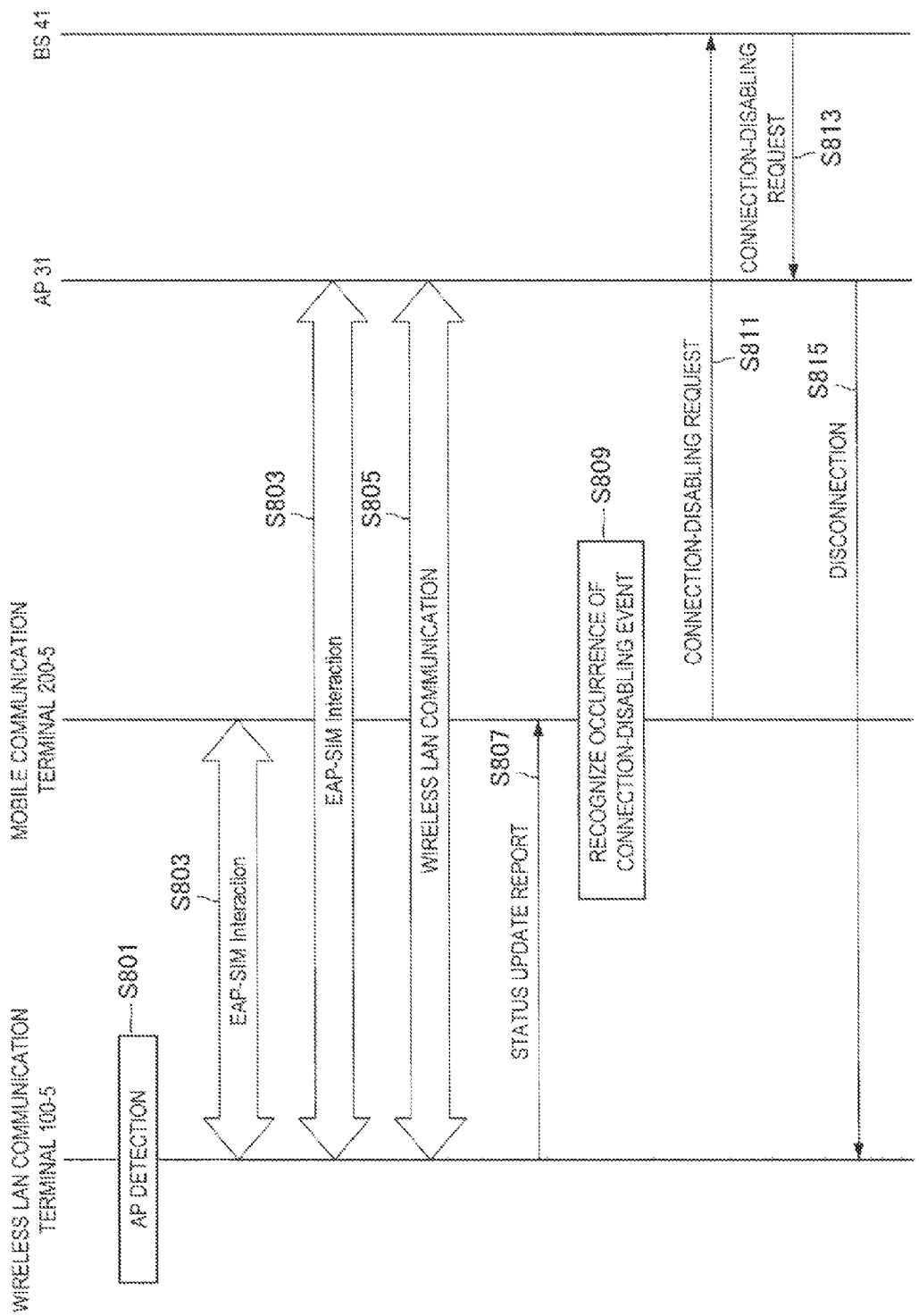

[Fig. 23]
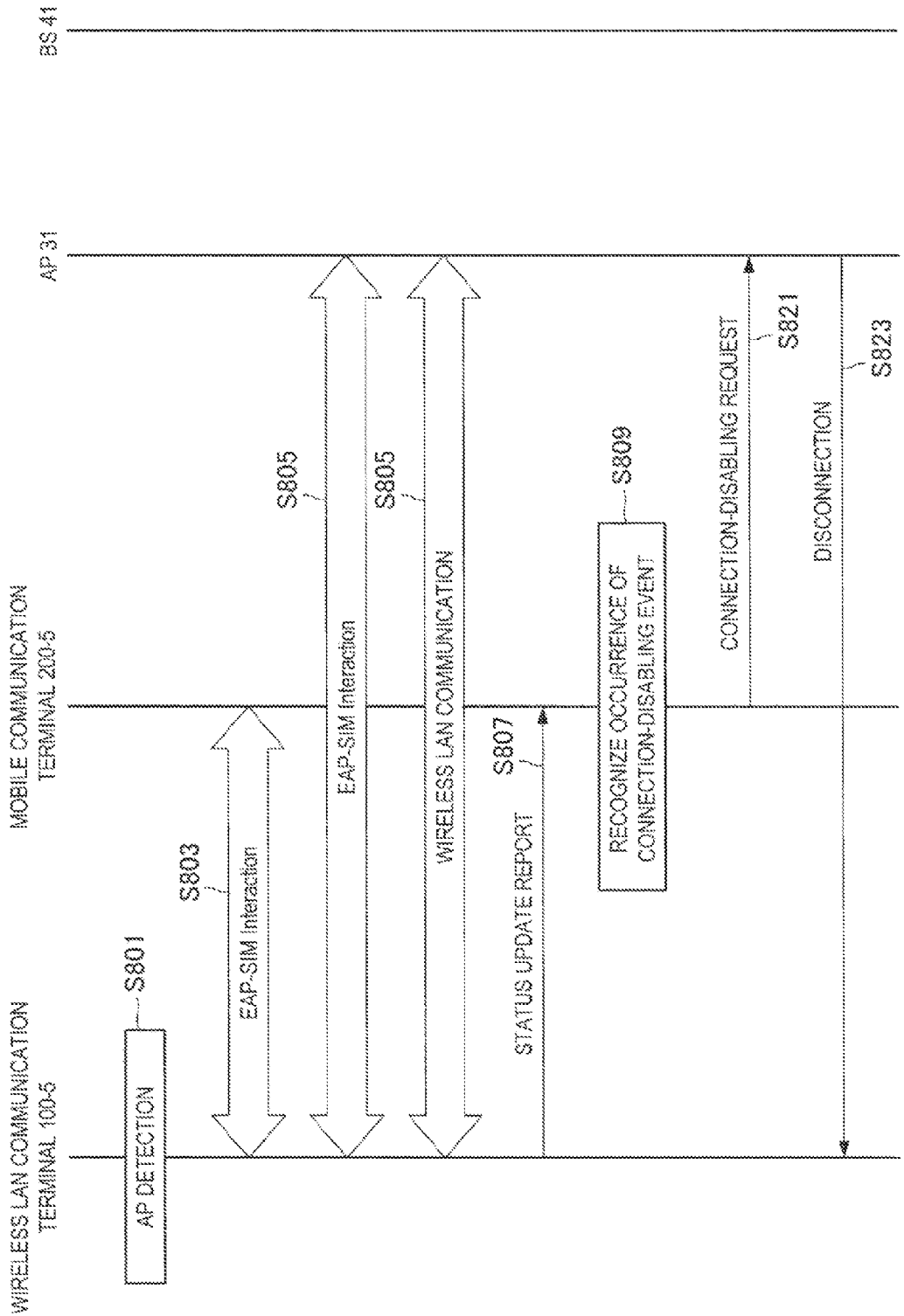

TERMINAL APPARATUS, PROGRAM, AND COMMUNICATION SYSTEM

CROSS REFERENCE TO RELATED APPLICATIONS

This application claims the benefit of Japanese Priority Patent Application JP 2013-012108 filed Jan. 25, 2013, the entire contents of which are incorporated herein by reference.

TECHNICAL FIELD

The present disclosure relates to a terminal apparatus, a program, and a communication system.

BACKGROUND ART

In recent years, apparatuses each having a communication function of a wireless local area network (LAN) have been in widespread use. As examples of such apparatuses, various apparatuses are mentioned such as a smartphone also having a mobile communication function in a mobile communication service, a personal computer (PC), a tablet terminal, a portable game device, a digital camera, and a printer.

Generally, an apparatus having a function of wireless LAN communication connects to a network through wireless LAN communication with an access point. As another way of connection that does not use an access point, the apparatus may connect, for example, to a mobile communication terminal, and connect to a network through mobile communication performed by the mobile communication terminal. That is, the apparatus may connect to a network by tethering.

If the apparatus also has a mobile communication function, the apparatus may perform authentication, for example, by use of a subscriber identity module (SIM). If the authentication succeeds, the apparatus may connect to a network through wireless LAN communication with an access point. Specifically, for example, the apparatus may perform extensible authentication protocol (EAP)-SIM authentication to connect to a network through wireless LAN communication with an access point. For example, PTL 1 discloses a technique for cooperatively authenticating multiple apparatuses in EAP-SIM authentication.

CITATION LIST

Patent Literature

PTL 1: JP 2011-182335A

SUMMARY

Technical Problem

However, the related technique as described above has some disadvantages. For example, when an apparatus connects to a network through wireless LAN communication with a new access point, a user of the apparatus generally has to enter a password for user authentication of the apparatus. Consequently, the above-mentioned technique takes the user some time. Meanwhile, if the apparatus does not perform mobile communication in a mobile communication service provided by a mobile communication service provider, the apparatus fails in performing authentication (such as EAP-SIM authentication) by use of its own SIM, as described above. As a result, the user also has to take trouble. When the apparatus connects to a network by tethering, the apparatus and a mobile communication terminal that provides a tethering function constantly operate. As a result, power consumption increases as a whole.

It is therefore desirable to provide a mechanism that enables trouble of a user of an apparatus that does not perform mobile communication in a mobile communication service to be saved, and increase in power consumption to be reduced when the apparatus connects to a network.

Solution to Problem

In accordance with one aspect of the present disclosure, in some embodiments, a method involves acts of (a) communicating authentication information comprising mobile subscriber information of a mobile communication terminal to a server, and (b) further communicating with the server to perform an authentication procedure to enable a wireless LAN communication terminal separate from the mobile communication terminal to connect to a network via wireless LAN communication with an access point separate from the mobile communication terminal.

According to another aspect, in some embodiments, a wireless LAN communication apparatus comprises a wireless LAN communication unit, an authentication information acquisition unit, and an authentication processing unit. The wireless LAN communication unit is configured to perform wireless LAN communication. The authentication information acquisition unit is configured to receive authentication information comprising mobile subscriber information from a mobile communication terminal. The authentication processing unit is configured to use the received authentication information to perform an authentication procedure to enable the wireless LAN communication apparatus to connect to a network through wireless LAN communication with an access point.

According to still another aspect, in some embodiments, a mobile communication apparatus comprises a mobile communication unit and an authentication information providing unit. The mobile communication unit may be configured to perform mobile communication in a mobile communication service. The authentication information providing unit may be configured to communicate authentication information comprising mobile subscriber information to a wireless LAN communication terminal separate from the mobile communication apparatus, and to further communicate with the wireless LAN communication terminal to allow the wireless LAN communication terminal to perform an authentication procedure using the authentication information to enable the wireless LAN communication terminal to connect to a network.

According to still another aspect, in some embodiments, a non-transient computer-readable medium has instructions encoded thereon which, when executed by at least one processor, cause the at least one processor to perform a method comprising acts of: (a) causing the communication of authentication information comprising mobile subscriber information of a mobile communication terminal to a server; and (b) further causing communication with the server to perform an authentication procedure to enable a wireless LAN communication terminal separate from the mobile communication terminal to connect to a network via wireless LAN communication with an access point separate from the mobile communication terminal.

According to still another aspect, in some embodiments, a non-transient computer-readable medium has instructions encoded thereon which, when executed by at least one processor of a mobile communication terminal, cause the mobile communication terminal to perform a method comprising acts of: (a) communicating authentication information comprising mobile subscriber information to a wireless LAN communication terminal separate from the mobile communication terminal; and (b) further communicating with the wireless LAN communication terminal to allow the wireless LAN communication terminal to perform an authentication procedure using the authentication information to enable the wireless LAN communication terminal to connect to a network.

Advantageous Effects of Invention

According to one or more of embodiments of the present disclosure, it becomes possible to save trouble of a user of an apparatus that does not perform mobile communication in a mobile communication service, and to reduce increase in power consumption when the apparatus connects to a network.

BRIEF DESCRIPTION OF DRAWINGS

FIG. 1 is an explanatory diagram for describing an example of connection to a network via an AP.

FIG. 2 is an explanatory diagram for describing an example of connection to a network by tethering.

FIG. 3 is an explanatory diagram for describing an example of connection to a network by use of EAP-SIM authentication.

FIG. 4 is a sequence diagram illustrating an example schematic flow of an EAP-SIM authentication procedure.

FIG. 5 is an explanatory diagram illustrating an example schematic configuration of a communication system according to an embodiment of the present disclosure.

FIG. 6 is a block diagram illustrating an example configuration of a wireless LAN communication terminal according to a first embodiment.

FIG. 7 is a block diagram illustrating an example configuration of a mobile communication terminal according to the first embodiment.

FIG. 8 is a sequence diagram illustrating an example schematic flow of a communication control process according to the first embodiment.

FIG. 9 is a block diagram illustrating an example configuration of a wireless LAN communication terminal according to a second embodiment.

FIG. 10 is a block diagram illustrating an example configuration of a mobile communication terminal according to the second embodiment.

FIG. 11 is a sequence diagram illustrating an example schematic flow of a first communication control process according to the second embodiment.

FIG. 12 is a sequence diagram illustrating an example schematic flow of a second communication control process according to the second embodiment.

FIG. 13 is a block diagram illustrating an example configuration of a wireless LAN communication terminal according to a third embodiment.

FIG. 14 is a block diagram illustrating an example configuration of a mobile communication terminal according to the third embodiment.

FIG. 15 is a sequence diagram illustrating an example schematic flow of a first communication control process according to the third embodiment.

FIG. 16 is a sequence diagram illustrating an example schematic flow of a second communication control process according to the third embodiment.

FIG. 17 is a block diagram illustrating an example configuration of a wireless LAN communication terminal according to a fourth embodiment.

FIG. 18 is a block diagram illustrating an example configuration of a mobile communication terminal according to the fourth embodiment.

FIG. 19 is a sequence diagram illustrating an example schematic flow of a first communication control process according to the fourth embodiment.

FIG. 20 is a sequence diagram illustrating an example schematic flow of a second communication control process according to the fourth embodiment.

FIG. 21 is a block diagram illustrating an example configuration of a mobile communication terminal according to a fifth embodiment.

FIG. 22 is a sequence diagram illustrating an example schematic flow of a first communication control process according the fifth embodiment.

FIG. 23 is a sequence diagram illustrating an example schematic flow of a second communication control process according to the fifth embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Introduction
2. Schematic Configuration of Communication System
3. First Embodiment
 3.1. Configuration of Wireless LAN Communication Terminal
 3.2. Configuration of Mobile Communication Terminal
 3.3. Process Flow
4. Second Embodiment
 4.1. Configuration of Wireless LAN Communication Terminal
 4.2. Configuration of Mobile Communication Terminal
 4.3. Process Flow
5. Third Embodiment
 5.1. Configuration of Wireless LAN Communication Terminal
 5.2. Configuration of Mobile Communication Terminal
 5.3. Process Flow
6. Fourth Embodiment
 6.1. Configuration of Wireless LAN Communication Terminal
 6.2. Configuration of Mobile Communication Terminal
 6.3. Process Flow
7. Fifth Embodiment
 7.1. Configuration of Mobile Communication Terminal
 7.2. Process Flow
8. Conclusion

1. INTRODUCTION

First of all, with reference to FIGS. 1 to 4, a way of connection of a wireless LAN communication terminal to a network and its technical disadvantages will be described.

(Way of Connection to Network)

As a way of connection to a network, general connection via an access point (which will be referred to as an "AP," hereinafter), connection by tethering, and connection by use of EAP-SIM authentication will be described.

General Connection Via AP

A wireless LAN communication terminal generally connects to a network through wireless LAN communication with an AP. With reference to FIG. 1, a specific example will be described on this point below.

FIG. 1 is an explanatory diagram for describing connection to a network via an AP. FIG. 1 illustrates a wireless LAN communication terminal 10, a network 30, and an AP 31. For example, the wireless LAN communication terminal 10 performs an authentication procedure for connection to the network 30. If the authentication succeeds, the wireless LAN communication terminal 10 connects to the network 30 through wireless LAN communication with the AP 31.

Additionally, the wireless LAN communication terminal 10 is a tablet terminal, for example. The network 30 includes, for example, an LAN and the Internet.

Connection by Tethering

As another way of connection that does not use an AP, a wireless LAN communication terminal may connect, for example, to a mobile communication terminal, and connect to a network through mobile communication performed by the mobile communication terminal. That is, the wireless LAN communication terminal may connect to a network by tethering. With reference to FIG. 2, a specific example will be described on this point below.

FIG. 2 is an explanatory diagram for describing an example of connection to a network by tethering. FIG. 2 illustrates a wireless LAN communication terminal 10, a mobile communication terminal 20, a network 30, a mobile communication service provider network 40, and a base station (which will be referred to as a "BS," hereinafter) 41. For example, the wireless LAN communication terminal 10 connects to the network 30 via the mobile communication terminal 20 through mobile communication. More specifically, for example, the wireless LAN communication terminal 10 transmits communication data to the mobile communication terminal 20, while the mobile communication terminal 20 transmits the communication data to the network 30 via the BS 41.

Connection Using Authentication Using SIM

If a wireless LAN communication terminal also has a mobile communication function in a mobile communication service, which namely means that the wireless LAN communication terminal is a mobile communication terminal, the wireless LAN communication terminal may perform authentication, for example, by use of an SIM. If the authentication succeeds, the wireless LAN communication terminal may connect to a network through wireless LAN communication with an AP. Specifically, for example, the wireless LAN communication terminal (mobile communication terminal) may perform EAP-SIM authentication, and connect to the network through wireless LAN communication with an access point. With reference to FIG. 3, a specific example will be described on this point below.

FIG. 3 is an explanatory diagram for describing an example of connection to a network by use of EAP-SIM authentication. FIG. 3 illustrates a wireless LAN communication terminal 10, a network 30, a mobile communication service provider network 40, and a BS 41. In this example, the wireless LAN communication terminal 10 is a mobile communication terminal also having a mobile communication function, and includes an universal integrated circuit card (UICC) as an SIM. For example, the wireless LAN communication terminal 10 performs EAP-SIM authentication by use of its own UICC. If the EAP-SIM authentication succeeds, the wireless LAN communication terminal 10 connects to the network 30 through wireless LAN communication with the AP 31.

With reference to FIG. 4, an example of an EAP-SIM authentication procedure will be described below.

Process Flow of EAP-SIM Authentication

FIG. 4 is a sequence diagram illustrating an example schematic flow of an EAP-SIM authentication procedure.

First of all, EAP-Request Identity is transmitted from the AP 31 to the wireless LAN communication terminal 10, and transferred from a host to a UICC by the wireless LAN communication terminal 10 (S1001 and S1003). Subsequently, EAP-Response Identity including an international mobile subscriber identity (IMSI) for a user of the wireless LAN communication terminal 10 is transmitted from the UICC to the host, and transferred from the wireless LAN communication terminal 10 to a remote authentication dial in user service (RADIUS) server (S1005 and S1007).

Triplets including an RAND, an SRES, and a Kc are acquired from the IMSI for the user of the wireless LAN communication terminal 10, and transmitted from a home location register/authentication center (HLC/AuC) server to the RADIUS server (S1009 to S1013). The RAND is a random number. The SRES is data that is used for authentication of the wireless LAN communication terminal 10, which is performed by the RADIUS server, and is generated in accordance with A3 algorithm on the basis of a Ki that is a key unique to the UICC and the RAND. The Kc is a key used for encryption of data in wireless LAN communication, and is generated in accordance with A8 algorithm on the basis of the Ki and the RAND.

Thereafter, EAP-Request/SIM/Start is transmitted from the RADIUS server to the wireless LAN communication terminal 10, and transferred from the host to the UICC by the wireless LAN communication terminal 10 (S1015 and S1017). Subsequently, the UICC generates a Nonce used for authentication of a network, which is performed by the UICC (S1019). EAP-Request/SIM/Start including the Nonce is transmitted from the UICC to the host, and transferred from the wireless LAN communication terminal 10 to the RADIUS server (S1021 and S1023).

Next, the RADIUS server generates a message authentication code (MAC) that is used for authentication of the network, which is performed by the UICC (S1025). The MAC is generated on the basis of the Kc and the Nonce.

Thereafter, EAP-Request/SIM/Challenge including the MAC and the RAND is transmitted from the RADIUS server to the wireless LAN communication terminal 10, and transferred from the host to the UICC by the wireless LAN communication terminal 10 (S1027 and S1029). Next, the UICC performs authentication of the network (S1031). More specifically, the UICC generates a Kc on the basis of the Ki and the RAND, and generates a MAC on the basis of the Kc and the Nonce. The UICC compares the generated MAC with the received MAC. If both MACs match with each other, the UICC authenticates the network.

While the UICC authenticates the network, the UICC generates a further message authentication code (MAC2) in accordance with A3 algorithm on the basis of the Ki and the RAND. That is, the MAC 2 corresponds to the SRES. The UICC also generates a Kc in accordance with A8 algorithm on the basis of the Ki and the RAND.

EAP-Request/SIM/Start including the MAC2 is transmitted from the UICC to the host, and transferred from the wireless LAN communication terminal 10 to the RADIUS server (S1033 and S1035). Subsequently, the RADIUS server authenticates the user of the wireless LAN communication terminal 10 (S1037). More specifically, the RADIUS server compares the SRES with the received MAC2. If they match with each other, the RADIUS server authenticates the user of the wireless LAN communication terminal 10.

After the user of the wireless LAN communication terminal 10 is authenticated, EAP-Success is transmitted from the RADIUS server to the wireless LAN communication terminal 10, and transferred from the host to the UICC by the wireless LAN communication terminal 10 (S1039 and S1041). Next, the wireless LAN communication terminal 10 connects to the network 30 through wireless LAN communication with the AP 31.

(Technical Disadvantages)

However, the way of connection to a network as described above has some disadvantages.

First of all, the above-described general way of connection via an AP usually requests a user to enter a password for user authentication of a wireless LAN communication terminal when the wireless LAN communication terminal connects to a network through wireless LAN communication with a new AP. The general way of connection therefore takes the user some time.

The above-described way of connection using authentication using an SIM presupposes that a wireless LAN communication terminal performs mobile communication in a mobile communication service. Accordingly, if the wireless LAN communication terminal does not perform mobile communication, the wireless LAN communication terminal fails in performing authentication (such as EAP-SIM authentication) by use of its own SIM. As a result, it is not possible to save trouble of a user.

The above-described way of connection by tethering requests both of a wireless LAN communication terminal and a mobile communication terminal that provides a tethering function to constantly operate. As a result, power consumption increases as a whole.

According to an embodiment of the present disclosure, it becomes therefore possible to save trouble of a user of an apparatus that does not perform mobile communication in a mobile communication service, and to reduce increase in power consumption when the apparatus connects to a network.

2. SCHEMATIC CONFIGURATION OF COMMUNICATION SYSTEM

Next, with reference to FIG. 5, a schematic configuration of a communication system 1 according to an embodiment of the present disclosure will be described. FIG. 5 is an explanatory diagram illustrating an example schematic configuration of the communication system 1 according to the embodiment of the present disclosure. With reference to FIG. 5, the communication system 1 includes a network 30, an AP 31, a RADIUS server 33, a mobile communication service provider network 40, a BS 41, an HLC/AuC server 43, a wireless LAN communication terminal 100, and a mobile communication terminal 200.

The wireless LAN communication terminal 100 performs wireless communication that is different from mobile communication in a mobile communication service. For example, the wireless communication is wireless LAN communication. That is, the wireless LAN communication terminal 100 performs wireless LAN communication. More specifically, for example, the wireless LAN communication terminal 100 performs an authentication procedure with the RADIUS server 33 for connection to the network 30 through wireless LAN communication. If the authentication succeeds, the wireless LAN communication terminal 100 connects to the network 30 through wireless LAN communication with the AP 31.

The wireless LAN communication terminal 100 is a tablet terminal, for example. The network 30 includes, for example, an LAN and the Internet.

The mobile communication terminal 200 performs mobile communication in a mobile communication service. For example, the mobile communication is compatible with any communication scheme (such as the wideband code division multiple access (W-CDMA) and the long term evolution (LTE)) in the third generation partnership project (3GPP). The mobile communication service is provided by a mobile communication service provider. The mobile communication can also be referred to as cellular communication. For example, the mobile communication terminal 200 performs an authentication procedure with the HLC/AuC server 43 for connection to a mobile communication network. If the authentication succeeds, the mobile communication terminal 200 connects to the mobile communication network.

The mobile communication terminal 200 is a smartphone, for example. The mobile communication service provider network 40 includes, for example, an element of a wired network of the mobile communication network, and a wireless access network and a core network other than the BS 41 and the HLC/AuC server 43.

The wireless LAN communication terminal 100 and the mobile communication terminal 200 communicate with each other. As an example, the wireless LAN communication terminal 100 and the mobile communication terminal 200 perform directly connected wireless LAN communication.

The wireless LAN communication terminal 100 performs an authentication procedure by use of authentication information provided by an SIM of the mobile communication terminal 200 especially in the embodiment of the present disclosure. The specific details will be described below.

3. FIRST EMBODIMENT

Next, with reference to FIGS. 6 to 8, a first embodiment of the present disclosure will be described. According to the first embodiment of the present disclosure, it becomes possible to save trouble of a user of an apparatus that does not perform mobile communication in a mobile communication service, and to reduce increase in power consumption when the apparatus connects to a network.

<3.1. Configuration of Wireless LAN Communication Terminal>

With reference to FIG. 6, an example configuration of a wireless LAN communication terminal 100-1 according to the first embodiment will be described. FIG. 6 is a block diagram illustrating the example configuration of the wireless LAN communication terminal 100-1 according to the first embodiment. With reference to FIG. 6, the wireless LAN communication terminal 100-1 includes a wireless LAN communication unit 110, a storage unit 120, and a control unit 130.

(Wireless LAN Communication Unit 110)

The wireless LAN communication unit 110 performs wireless LAN communication. For example, the wireless LAN communication unit 110 performs wireless LAN communication with an AP 31. For example, the wireless LAN communication unit 110 is directly connected to perform wireless LAN communication with a mobile communication terminal 200-1.

The wireless LAN communication unit 110 includes, for example, a communication antenna for wireless LAN communication, a radio frequency (RF) circuit, and another information processing circuit.

(Storage Unit 120)

The storage unit 120 stores a program and data for an operation of the wireless LAN communication terminal 100-1. The storage unit 120 includes, for example, a magnetic storage device such as a hard disk, or a non-volatile memory such as electrically erasable and programmable read only memory (EPROM) and flash memory.

(Control Unit 130)

The control unit 130 provides various functions of the wireless LAN communication terminal 100-1. For example, the control unit 130 includes a processor such as a central processing unit (CPU) and a digital signal processor (DSP). The control unit 130 executes a program stored in the storage unit 120 or another storage medium to provide the various functions. The control unit 130 includes an authentication information acquisition unit 131 and an authentication processing unit 133.

(Authentication Information Acquisition Unit 131)

Acquisition of Authentication Information Provided by UICC

The authentication information acquisition unit 131 acquires authentication information provided by a subscriber identity module (SIM) of the mobile communication terminal 200-1.

For example, the SIM is a UICC. The authentication information acquisition unit 131 acquires authentication information provided by the UICC of the mobile communication terminal 200-1 in an EAP-SIM authentication procedure. For example, the authentication information is transmitted by the mobile communication terminal 200-1, received by the wireless LAN communication unit 110, and acquired by the authentication information acquisition unit 131.

As an example, the authentication information includes EAP-Response Identity including an IMSI for a user of the mobile communication terminal 200-1. As another example, the authentication information includes EAP-Request/SIM/Start including a Nonce that is used for authentication of a network, which is performed by the UICC. As still another example, the authentication information includes EAP-Request/SIM/Start including a message authentication code (MAC2) generated by the UICC.

As described above, the authentication information acquisition unit 131 acquires authentication information provided by the SIM of the mobile communication terminal 200-1. The authentication information acquisition unit 131 provides the acquired authentication information to the authentication processing unit 133.

Providing Authentication Information to be Provided to UICC to Mobile Communication Terminal 200-1

For example, the authentication information acquisition unit 131 provides authentication information to be provided to the SIM of the mobile communication terminal 200-1 to the mobile communication terminal 200-1.

For example, the SIM is a UICC. The authentication information acquisition unit 131 provides authentication information to be provided to the UICC of the mobile communication terminal 200-1 to the mobile communication terminal 200-1 via the wireless LAN communication unit 110 in an EAP-SIM authentication procedure. For example, the authentication information acquisition unit 131 is provided with the authentication information by the authentication processing unit 133, and causes the wireless LAN communication unit 110 to transmit the authentication information to the mobile communication terminal 200-1.

As an example, the authentication information includes EAP-Request Identity that is transmitted by the AP 31. As another example, the authentication information includes EAP-Request/SIM/Start that is transmitted by the RADIUS server. As still another example, the authentication information includes EAP-Request/SIM/Challenge that is transmitted by the RADIUS server. As still another example, the authentication information includes EAP-Success that is transmitted by the RADIUS server.

As described above, the authentication information acquisition unit 131 provides, for example, authentication information to be provided to the SIM of the mobile communication terminal 200-1 to the mobile communication terminal 200-1.

(Authentication Processing Unit 133)

The authentication processing unit 133 uses the authentication information provided by the SIM of the mobile communication terminal 200-1 to perform an authentication procedure for connection to the network 30 through wireless LAN communication.

For example, the SIM is a UICC. The authentication procedure is an EAP-SIM authentication procedure for the wireless LAN communication terminal 100-1 to connect to the network 30 through wireless LAN communication.

For example, the authentication processing unit 133 acquires, via the communication unit 110, authentication information (namely, authentication information to be provided to the UICC of the mobile communication terminal 200-1) that is transmitted by the AP 31 and the RADIUS server 33. The authentication processing unit 133 provides the acquired authentication information to the authentication information acquisition unit 131. The authentication information acquisition unit 131 provides the authentication information to the mobile communication terminal 200-1.

For example, the authentication processing unit 133 provides the authentication information (namely, authentication information provided by the UICC of the mobile communication terminal 200-1) acquired by the authentication information acquisition unit 131 to the RADIUS server 33 via the communication unit 110.

As described above, the authentication information acquisition unit 131 uses authentication information provided by the SIM of the mobile communication terminal 200-1, and performs an authentication procedure for connection to the network 30 through wireless LAN communication. As the result of the authentication procedure, if a user of the mobile communication terminal 200-1 is authenticated, the wireless LAN communication terminal 100-1 is permitted to connect to the network 30. That is, the wireless LAN communication terminal 100-1 is permitted to connect to the network 30 through wireless LAN communication with the AP 31. Thereafter, the wireless LAN communication terminal 100-1 connects to the network 30 through wireless LAN communication with the AP 31.

<3.2. Configuration of Mobile Communication Terminal>

Next, with reference to FIG. 7, an example configuration of the mobile communication terminal 200-1 according to the first embodiment will be described. FIG. 7 is a block diagram illustrating the configuration example of the mobile communication terminal 200-1 according to the first embodiment. With reference to FIG. 7, the mobile communication terminal 200-1 includes a mobile communication unit 210, a wireless LAN communication unit 220, an SIM 230, a storage unit 240, and a control unit 250.

(Mobile Communication Unit 210)

The mobile communication unit 210 performs mobile communication in a mobile communication service. For example, the mobile communication is compatible with any communication scheme (such as the W-CDMA and the LTE) in the 3GPP. For example, the mobile communication unit 210 transmits and receives communication data via the BS 41.

The mobile communication unit 210 includes, for example, a communication antenna for mobile communication, an RF circuit, and another information processing circuit.

(Wireless LAN Communication Unit 220)

The wireless LAN communication unit 220 performs wireless LAN communication. For example, the wireless LAN communication unit 220 is directly connected to perform wireless LAN communication with the wireless LAN communication terminal 100-1. For example, the wireless LAN communication unit 220 performs wireless LAN communication with the AP 31.

The wireless LAN communication unit 220 includes, for example, a communication antenna for wireless LAN communication, an RF circuit, and another information processing circuit.

(SIM 230)

The SIM 230 performs a process for authenticating the user of the mobile communication terminal 200-1. For example, the SIM 230 is a UICC, and performs a process for EAP-SIM authentication.

As an example, the SIM 230 generates a Nonce that is used for authentication of a network.

As another example, the SIM 230 authenticates the network. More specifically, for example, the SIM 230 generates a Kc on the basis of a Ki and an RAND, and generates a message authentication code (MAC) on the basis of the Kc and the Nonce. The UICC compares the generated MAC with the provided MAC. If both MACs match with each other, the UICC authenticates the network.

As still another example, the SIM 230 generates a message authentication code (MAC2) for authenticating the user of the mobile communication terminal 200-1. More specifically, for example, the SIM 230 generates an MAC2 in accordance with A3 algorithm on the basis of a Ki and a RAND. The MAC2 corresponds to an SRES.

The SIM 230 provides authentication information. For example, the SIM 230 provides authentication information to the control unit 250 (authentication information providing unit 251).

As an example, the authentication information includes EAP-Response Identity including an IMSI for the user of the mobile communication terminal 200-1. As another example, the authentication information includes EAP-Request/SIM/Start including the Nonce. As still another example, the authentication information includes EAP-Request/SIM/Start including the message authentication information (MAC2) generated by the UICC.

(Storage Unit 240)

The storage unit 240 stores a program and data for an operation of the mobile communication terminal 200-1. The storage unit 240 includes, for example, a magnetic storage device such as a hard disk, or a non-volatile memory such as EEPROM and flash memory.

(Control Unit 250)

The control unit 250 provides various functions of the mobile communication terminal 200-1. For example, the control unit 250 includes a processor such as a CPU and a DSP. The control unit 250 executes a program stored in the storage unit 240 or another storage medium to provide the various functions. The control unit 250 includes an authentication information providing unit 251.

(Authentication Information Providing Unit 251)

The authentication information providing unit 251 provides authentication information provided by the SIM 230 of the mobile communication terminal 200-1 to the wireless LAN communication terminal 100-1.

Providing Authentication Information Provided by UICC to Wireless LAN Communication Terminal 100-1

For example, the SIM 230 is a UICC. The authentication information providing unit 251 provides authentication information provided by the SIM 230 (UICC) to the wireless LAN communication terminal 100-1 via the wireless LAN communication unit 220 in an EAP-SIM authentication procedure.

As an example, the authentication information includes EAP-Response Identity including an IMSI for the user of the mobile communication terminal 200-1. As another example, the authentication information includes EAP-Request/SIM/Start including a Nonce that is used for authentication of a network, which is performed by the UICC. As still another example, the authentication information includes EAP-Request/SIM/Start including a message authentication code (MAC2) generated by the UICC.

When satisfying a predetermined condition, the authentication information providing unit 251 may provide authentication information provided by the SIM 230 (UICC) to the wireless LAN communication terminal 100-1. As an example, the predetermined condition may be a condition in which the mobile communication terminal 200-1 detects a predetermined user operation. As another example, the predetermined condition may be a condition in which the wireless LAN communication terminal 100-1 is registered by the mobile communication terminal 200-1 in advance.

Providing Authentication Information to be Provided to UICC to UICC

For example, the authentication information providing unit 251 provides authentication information to be provided to the SIM 230 (UICC) to the SIM 230 (UICC) in an EAP-SIM authentication procedure. For example, the authentication information is transmitted by the wireless LAN communication terminal 100-1, received by the wireless LAN communication unit 220, acquired by the authentication information providing unit 251, and provided to the SIM 230 by the authentication information providing unit 251.

As an example, the authentication information includes EAP-Request Identity transmitted by the AP 31. As another example, the authentication information includes EAP-Request/SIM/Start transmitted by the RADIUS server. As still another example, the authentication information includes EAP-Request/SIM/Challenge transmitted by the RADIUS server. As still another example, the authentication information includes EAP-Success transmitted by the RADIUS server.

<3.3. Process Flow>

Next, with reference to FIG. 8, an example of a communication control process according to the first embodiment will be described. FIG. 8 is a sequence diagram illustrating an example schematic flow of the communication control process according to the first embodiment.

First of all, EAP-Request Identity is transmitted to the wireless LAN communication terminal 100-1 by the AP 31, acquired by the authentication processing unit 133, and provided to the authentication information acquisition unit 131 by the authentication processing unit 133 (S401). Subsequently, EAP-Request Identity is provided to the mobile communication terminal 200-1 by the authentication information acquisition unit 131, acquired by the authentication information providing unit 251, and provided to the SIM 230 (S403). As described above, the SIM 230 is, for example, a UICC.

Next, EAP-Response Identity including an IMSI for a user of the mobile communication terminal 200-1 is provided to the authentication information providing unit 251 by the SIM 230, and provided to the wireless LAN communication terminal 100-1 by the authentication information providing unit 251 (S405). Subsequently, EAP-Response Identity is acquired by the authentication information acquisition unit 131, and provided to the authentication processing unit 133. Furthermore, EAP-Response Identity including the IMSI is provided to the RADIUS server 33 by the authentication processing unit 133 (S407).

Thereafter, triplets including an RAND, an SRES, and a Kc are acquired from the IMSI for the user of the mobile communication terminal 200-1, and the triplets are transmitted to the RADIUS server 33 by the HLC/AuC server 43 (S409 to S413). The RAND, the SRES, and the Kc are the same as described with reference to FIG. 4.

EAP-Request/SIM/Start is transmitted to the wireless LAN communication terminal 100-1 by the RADIUS server 33, acquired by the authentication processing unit 133, and provided to the authentication information acquisition unit 131 by the authentication processing unit 133 (S415). Subsequently, EAP-Request/SIM/Start is provided to the mobile communication terminal 200-1 by the authentication information acquisition unit 131, acquired by the authentication information providing unit 251, and provided to the SIM 230 (S417).

Thereafter, the SIM 230 generates a Nonce that is used for authentication of a network, which is performed by the SIM 230 (S419). EAP-Request/SIM/Start including the Nonce is provided to the authentication information providing unit 251 by the SIM 230, and provided to the wireless LAN communication terminal 100-1 by the authentication information providing unit 251 (S421). Subsequently, EAP-Request/SIM/Start including the Nonce is acquired by the authentication information acquisition unit 131, and provided to the authentication processing unit 133. Furthermore, EAP-Request/SIM/Start including the Nonce is provided to the RADIUS server 33 by the authentication processing unit 133 (S423).

The RADIUS server 33 generates an MAC that is used for authentication of a network, which is performed by the SIM 230 (S425). Thereafter, EAP-Request/SIM/Challenge including the MAC and an RAND is transmitted to the wireless LAN communication terminal 100-1 by the RADIUS server 33, acquired by the authentication processing unit 133, and provided to the authentication information acquisition unit 131 by the authentication processing unit 133 (S427). Subsequently, EAP-Request/SIM/Challenge including the MAC and the RAND is provided to the mobile communication terminal 200-1 by the authentication information acquisition unit 131, acquired by the authentication information providing unit 251, and provided to the SIM 230 (S429).

Thereafter, the SIM 230 authenticates the network (S431). More specifically, the SIM 230 generates a Kc on the basis of the Ki and the RAND, and generates an MAC on the basis of the Kc and the Nonce. The SIM 230 compares the generated MAC with the received MAC. If both MACs match with each other, the SIM 230 authenticates the network.

While the SIM 230 authenticates the network, the SIM 230 generates a further message authentication code (MAC2) in accordance with A3 algorithm on the basis of the Ki and the RAND. That is, the MAC2 corresponds to an SRES. Additionally, the SIM 230 also generates a Kc in accordance with A8 algorithm on the basis of the Ki and the RAND.

EAP-Request/SIM/Start including the MAC2 is provided to the authentication information providing unit 251 by the SIM 230, and provided to the wireless LAN communication terminal 100-1 by the authentication information providing unit 251 (S433). Subsequently, EAP-Request/SIM/Start including the MAC2 is acquired by the authentication information acquisition unit 131, and provided to the authentication processing unit 133. Furthermore, EAP-Request/SIM/Start including the MAC2 is provided to the RADIUS server 33 by the authentication processing unit 133 (S435).

Thereafter, the RADIUS server 33 authenticates the user of the mobile communication terminal 200-1 (S437). More specifically, the RADIUS server 33 compares the SRES with the received MAC2. If they match with each other, the RADIUS server 33 authenticates the user of the mobile communication terminal 200-1.

When the user of the mobile communication terminal 200-1 is authenticated, EAP-Success is transmitted from the RADIUS server 33 to the wireless LAN communication terminal 100-1, acquired by the authentication processing unit 133, and provided to the authentication information acquisition unit 131 by the authentication processing unit 133 (S439). Subsequently, EAP-Success is provided to the mobile communication terminal 200-1 by the authentication information acquisition unit 131, acquired by the authentication information providing unit 251, and provided to the SIM 230 (S441).

The wireless LAN communication terminal 100-1 connects to the network 30 through wireless LAN communication with the AP 31.

As above, the first embodiment according to the present disclosure has been described. According to the first embodiment, the wireless LAN communication terminal 100 uses authentication information provided by the SIM 230 of the mobile communication terminal 200 to perform an authentication procedure for connection to a network through wireless LAN communication. That is, the wireless LAN communication terminal 100 uses the SIM 230 of the mobile communication terminal 200 to perform an authentication procedure. Accordingly, when the wireless LAN communication terminal 100 that does not perform mobile communication in a mobile communication service connects to the network 30, it hereby becomes possible to save trouble of a user of the wireless LAN communication terminal 100, and to reduce increase in power consumption of the mobile communication terminal 200.

4. SECOND EMBODIMENT

Next, with reference to FIGS. 9 to 12, a second embodiment of the present disclosure will be described. According to the second embodiment of the present disclosure, it becomes possible to maintain connection of the wireless LAN communication terminal 100 to the network 30.

<4.1. Configuration of Wireless LAN Communication Terminal>

With reference to FIG. 9, an example configuration of a wireless LAN communication terminal 100-2 according to the second embodiment will be described. FIG. 9 is a block diagram illustrating the example configuration of the wireless LAN communication terminal 100-2 according to the second embodiment. With reference to FIG. 9, the wireless LAN communication terminal 100-2 includes a wireless LAN communication unit 110, a storage unit 120, and a control unit 140.

Here, there is no difference between the first embodiment and the second embodiment with respect to the wireless LAN communication unit 110 and the storage unit 120, and the authentication information acquisition unit 131 and the authentication processing unit 133 of the control unit 140. Accordingly, a switching event recognition unit 141 and a connection control unit 143 of the control unit 140 will be here described.

(Switching Event Recognition Unit 141)

The switching event recognition unit 141 recognizes occurrence of a predetermined event (which will be referred to as a "switching event," hereinafter).

For example, the switching event includes an event in which an AP for wireless LAN communication is detected. That is, the switching event recognition unit 141 recognizes that an AP for wireless LAN communication is detected. For example, the control unit 140 searches for an AP 31 positioned in the vicinity of the wireless LAN communication terminal 100-2. When the wireless LAN communication terminal 100-2 approaches the AP 31, the control unit 140 detects the AP 31. Thereafter, the switching event recognition unit 141 recognizes that the AP 31 has been detected.

For example, the switching event also includes an event in which the wireless LAN communication terminal 100-2 becomes incapable of communicating with an AP for wireless LAN communication. That is, the switching event recognition unit 141 recognizes that the wireless LAN communication terminal 100-2 has been incapable of communicating with an AP for wireless LAN communication. For example, the switching event recognition unit 141 continuously confirms whether the wireless LAN communication terminal 100-2 can communicate with the AP 31. When the wireless LAN communication terminal 100-2 becomes incapable of communicating with the AP 31, the switching event recognition unit 141 recognizes that the wireless LAN communication terminal 100-2 has been incapable of communicating with the AP 31.

As described above, the switching event recognition unit 141 recognizes occurrence of a switching event. When recognizing occurrence of a switching event, the switching event recognition unit 141 notifies the connection control unit 143 of the occurrence of the switching event.

(Connection Control Unit 143)

The connection control unit 143 controls the wireless LAN communication terminal 100-2 to connect to the network 30 via a mobile communication terminal 200-2 through mobile communication, or to connect to the network 30 through wireless LAN communication. That is, the connection control unit 143 controls the wireless LAN communication terminal 100-2 to connect to the network 30 by tethering, or to connect to the network 30 through its own wireless LAN communication.

The wireless LAN communication terminal 100-2 is hereby controlled to connect to the network 30 in any of the above-described ways of connection. Accordingly, it is possible to maintain connection of the wireless LAN communication terminal 100-2 to the network 30.

For example, the connection control unit 143 switches connection to the network 30 through mobile communication and connection to the network 30 through wireless LAN communication in response to occurrence of a switching event. That is, the connection control unit 143 switches connection by tethering and connection through its own wireless LAN communication in response to occurrence of a switching event.

Switching Connection by Tethering to Connection Through Wireless LAN Communication As described above, for example, a switching event includes an event in which an AP for wireless LAN communication is detected. In this case, when the AP is detected, the connection control unit 143 switches connection to the network 30 through mobile communication to connection to the network 30 through wireless LAN communication.

More specifically, for example, when the switching event recognition unit 141 notifies the connection control unit 143 that the AP 31 has been detected, the connection control unit 143 issues an instruction to the authentication processing unit 133 such that an authentication procedure for connection to the network 30 through wireless LAN communication is performed. Thereafter, if the authentication succeeds, the wireless LAN communication terminal 100-2 connects to the network 30 through wireless LAN communication.

Since the wireless LAN communication terminal 100-2 connects to the network 30 through wireless LAN communication by switching connection as described above in the case where communication with the AP 31 is possible, communication data via a mobile communication network can be reduced. That is, offload from the mobile communication network is promoted. Since connection by tethering is established only when necessary, increase in power consumption of the mobile communication terminal 200-2 can also be reduced.

Switching Connection Through Wireless LAN Communication to Connection by Tethering As described above, for example, a switching event includes an event in which the wireless LAN communication terminal 100-2 becomes incapable of communicating with an AP for wireless LAN communication. In this case, when the wireless LAN communication terminal 100-2 becomes incapable of communicating with the AP, the connection control unit 143 switches connection to the network 30 through wireless LAN communication to connection to the network 30 through mobile communication.

More specifically, for example, when the switching event recognition unit 141 notifies the connection control unit 143 that the wireless LAN communication terminal 100-2 has been incapable of communicating with the AP for wireless LAN communication, the connection control unit 143 requests connection by tethering from the mobile communication terminal 200-2 via the wireless LAN communication unit 110. Thereafter, if connection by tethering is permitted, the wireless LAN communication terminal 100-2 connects to the network 30 by tethering.

It is possible to maintain connection to the network 30 by switching connection as described above even when the wireless LAN communication terminal 100-2 becomes incapable of communicating with the AP 31 while connecting to the network 30 through wireless LAN communication.

<4.2. Configuration of Mobile Communication Terminal>

Next, with reference to FIG. 10, an example configuration of the mobile communication terminal 200-2 according to the second embodiment will be described. FIG. 10 is a block diagram illustrating the example configuration of the mobile communication terminal 200-2 according to the second embodiment. With reference to FIG. 10, the mobile communication terminal 200-2 includes a mobile communication unit 210, a wireless LAN communication unit 220, an SIM 230, a storage unit 240, and a control unit 260.

Here, there is no difference between the first embodiment and the second embodiment with respect to the mobile communication unit 210, the wireless LAN communication unit 220, the SIM 230 and the storage unit 240, and the authentication information providing unit 251 of the control unit 260. Accordingly, a tethering control unit 261 of the control unit 260 will be here described.

(Tethering Control Unit 261)

The tethering control unit 261 provides a tethering function of the mobile communication terminal 200-2.

For example, when the wireless LAN communication terminal 100-2 requests connection by tethering from the tethering control unit 261 via the wireless LAN communication unit 220, the tethering control unit 261 permits connection by tethering to the wireless LAN communication terminal 100-2.

For example, the tethering control unit 261 transfers, via the mobile communication unit 210, communication data received from the wireless LAN communication terminal 100-2 by the wireless LAN communication unit 220. The tethering control unit 261 also transfers communication data received by the mobile communication unit 210 and transmitted to the wireless LAN communication terminal 100-2 to another apparatus via the wireless LAN communication unit 220. The wireless LAN communication terminal 100-2 hereby connects to the network 30 by tethering.

<4.3. Process Flow>

Next, with reference to FIGS. 11 and 12, an example of a communication control process according to the second embodiment will be described.

(Switching Connection by Tethering to Connection Through Wireless LAN Communication)

FIG. 11 is a sequence diagram illustrating an example schematic flow of a first communication control process according to the second embodiment. The first communication control process is performed when connection by tethering is switched to connection through wireless LAN communication.

First of all, the mobile communication terminal 200-2 performs mobile communication (S501).

The connection control unit 143 of the wireless LAN communication terminal 100-2 requests connection by tethering from the mobile communication terminal 200-2 via the wireless LAN communication unit 110 (S503). Subsequently, the tethering control unit 261 of the mobile communication terminal 200-2 permits connection by tethering to the wireless LAN communication terminal 100-2 (S505). Thereafter, the wireless LAN communication terminal 100-2 and the mobile communication terminal 200-2 perform communication by tethering (S507).

Thereafter, when the wireless LAN communication terminal 100-2 approaches the AP 31 at any given timing, the control unit 140 of the wireless LAN communication terminal 100-2 detects the AP 31 (S509). The switching event recognition unit 141 of the wireless LAN communication terminal 100-2 recognizes that the AP 31 has been detected.

The connection control unit 143 of the wireless LAN communication terminal 100-2 issues an instruction to the authentication processing unit 133 such that an authentication procedure for connection to the network 30 through wireless LAN communication is performed. Subsequently, the authentication processing unit 133 performs an EAP-SIM authentication procedure along with the mobile communication terminal 200-2 and the RADIUS server 33 (with which communication is performed via the AP 31) (step S511). The authentication procedure is the same as described in the first embodiment with reference to FIG. 8.

Thereafter, if the authentication succeeds, the wireless LAN communication terminal 100-2 connects to the network 30 through wireless LAN communication and performs wireless LAN communication (S513).

(Switching Connection Through Wireless LAN Communication to Connection by Tethering)

FIG. 12 is a sequence diagram illustrating an example schematic flow of a second communication control process according to the second embodiment. The second communication control process is performed when connection through wireless LAN communication is switched to connection by tethering.

First of all, the mobile communication terminal 200-2 performs mobile communication (S531). Meanwhile, the wireless LAN communication terminal 100-2 performs wireless LAN communication (S533).

Thereafter, the wireless LAN communication terminal 100-2 becomes incapable of communicating with the AP 31 at any given timing (S535). Subsequently, the switching event recognition unit 141 of the wireless LAN communication terminal 100-2 recognizes that the wireless LAN communication terminal 100-2 has been incapable of communicating with the AP 31. The wireless LAN communication of the wireless LAN communication terminal 100-2 is disconnected from the AP 31 (S537).

The connection control unit 143 of the wireless LAN communication terminal 100-2 requests connection by tethering from the mobile communication terminal 200-2 via the wireless LAN communication unit 110 (S539). Subsequently, the tethering control unit 261 of the mobile communication terminal 200-2 permits connection by tethering to the wireless LAN communication terminal 100-2 (S541). Thereafter, the wireless LAN communication terminal 100-2 and the mobile communication terminal 200-2 perform communication by tethering (S543).

As above, the second embodiment according to the present disclosure has been described. According to the second embodiment, the wireless LAN communication terminal 100 is controlled to connect to the network 30 by tethering, or to connect to the network 30 through wireless LAN communication. It hereby becomes possible to maintain connection of the wireless LAN communication terminal 100 to the network 30.

5. THIRD EMBODIMENT

Next, with reference to FIGS. 13 to 16, a third embodiment of the present disclosure will be described. According to the third embodiment of the present disclosure, it becomes possible to maintain connection of the wireless LAN communication terminal 100 to the network 30, as described in the second embodiment. The wireless LAN communication terminal 100-2 performs control for maintaining connection in the second embodiment. Meanwhile, a mobile communication terminal also performs control for maintaining connection in the third embodiment.

<5.1. Configuration of Wireless LAN Communication Terminal>

With reference to FIG. 13, an example configuration of a wireless LAN communication terminal 100-3 according to the third embodiment will be described. FIG. 13 is a block diagram illustrating the example configuration of the wireless LAN communication terminal 100-3 according to the third embodiment. With reference to FIG. 13, the wireless LAN communication terminal 100-3 includes a wireless LAN communication unit 110, a storage unit 120, and a control unit 150.

Here, there is no difference between the first embodiment and the third embodiment with respect to the wireless LAN communication unit 110 and the storage unit 120, and the authentication information acquisition unit 131 and the authentication processing unit 133 of the control unit 140. Accordingly, a connection control unit 151 of the control unit 150 will be here described.

(Connection Control Unit 151)

The connection control unit 151 controls the wireless LAN communication terminal 100-2 to connect to the network 30 via a mobile communication terminal 200-3 through mobile communication, or to connect to the network 30 through wireless LAN communication. That is, the connection control unit 151 controls the wireless LAN communication terminal 100-3 to connect to the network 30 by tethering, or to connect to the network 30 through its own wireless LAN communication.

Since the wireless LAN communication terminal 100-3 is hereby controlled to connect to the network 30 in any of the above-described ways of connection, it is possible to maintain connection of the wireless LAN communication terminal 100-3 to the network 30.

For example, the connection control unit 151 switches connection to the network 30 through mobile communication and connection to the network 30 through wireless LAN communication in response to occurrence of a switching event. That is, the connection control unit 151 switches connection by tethering and connection through its own wireless LAN communication in response to occurrence of a switching event.

Switching Connection by Tethering to Connection Through Wireless LAN Communication For example, a switching event includes an event in which an AP for wireless LAN communication is detected. In this case, when the AP is detected, the connection control unit 151 switches connection to the network 30 through mobile communication to connection to the network 30 through wireless LAN communication.

More specifically, for example, the mobile communication terminal 200-3 notifies the connection control unit 151 via the wireless LAN communication unit 110 that the AP 31 has been detected. Subsequently, the connection control unit 151 issues an instruction to the authentication processing unit 133 such that an authentication procedure for connection to the network 30 through wireless LAN communication is performed. Thereafter, if the authentication succeeds, the wireless LAN communication terminal 100-3 connects to the network 30 through wireless LAN communication.

Additionally, the mobile communication terminal 200-3 does not have to notify the connection control unit 151 that the AP 31 has been detected, but may issue an instruction for switching connection to connection through wireless LAN communication, instead.

Since the wireless LAN communication terminal 100-3 connects to the network 30 through wireless LAN communication by switching connection as described above when the wireless LAN communication terminal 100-3 can communicate with the AP 31, communication data via a mobile communication network can be reduced. That is, offload from the mobile communication network is promoted. Since connection by tethering is established only when necessary, increase in power consumption of the mobile communication terminal 200-3 can be reduced.

Switching Connection Through Wireless LAN Communication to Connection by Tethering For example, a switching event includes an event in which the mobile communication terminal 200-3 becomes incapable of communicating with an AP for wireless LAN communication. In this case, when the mobile communication terminal 200-3 becomes incapable of communicating with the AP, the connection control unit 143 switches connection to the network 30 through wireless LAN communication to connection to the network 30 through mobile communication.

More specifically, for example, the mobile communication terminal 200-3 issues an instruction to the connection control unit 151 via the wireless LAN communication unit 110 such that connection is switched to connection by tethering. Subsequently, the connection control unit 151 connects the wireless LAN communication terminal 100-3 to the network 30 by tethering.

Additionally, the mobile communication terminal 200-3 does not have to issue an instruction to the connection control unit 151 such that connection is switched to connection by tethering. Instead, the connection control unit 151 may be notified that the mobile communication terminal 200-3 has been incapable of communicating with an AP for wireless LAN communication.

Before connecting the wireless LAN communication terminal 100-3 to the network 30 by tethering, the connection control unit 151 may request connection by tethering from the mobile communication terminal 200-3 via the wireless LAN communication unit 110. After connection by tethering is permitted, the wireless LAN communication terminal 100-3 may connect to the network 30 by tethering.

It is possible to maintain connection to the network 30 by switching connection as described above even when the wireless LAN communication terminal 100-3 becomes incapable of communicating with the AP 31 while connecting to the network 30 through wireless LAN communication.

<5.2. Configuration of Mobile Communication Terminal>

Next, with reference to FIG. 14, an example configuration of the mobile communication terminal 200-3 according to the third embodiment will be described. FIG. 14 is a block diagram illustrating the example configuration of the mobile communication terminal 200-3 according to the third embodiment. With reference to FIG. 14, the mobile communication terminal 200-3 includes a mobile communication unit 210, a wireless LAN communication unit 220, an SIM 230, a storage unit 240, and a control unit 270.

Here, there is no difference between the first embodiment and the third embodiment with respect to the mobile communication unit 210, the wireless LAN communication unit 220, the SIM 230 and the storage unit 240, and the authentication information providing unit 251 of the control unit 270. A tethering control unit 271 of the control unit 270 operates in the same way as the tethering control unit 261 according to the second embodiment. Accordingly, a switching event recognition unit 273 and a connection control unit 275 of the control unit 270 will be here described.

(Switching Event Recognition Unit 273)

The switching event recognition unit 273 recognizes occurrence of a switching event.

For example, a switching event includes an event in which an AP for wireless LAN communication is detected. That is, the switching event recognition unit 273 recognizes that an AP for wireless LAN communication has been detected. For example, the control unit 270 searches for an AP 31 in the vicinity of the mobile communication terminal 200-3. When the mobile communication terminal 200-3 approaches the AP 31, the control unit 270 detects the AP 31. Thereafter, the switching event recognition unit 273 recognizes that the AP 31 has been detected.

For example, a switching event includes an event in which the mobile communication terminal 200-3 becomes incapable of communicating with an AP for wireless LAN communication. That is, the switching event recognition unit 273 recognizes that the mobile communication terminal 200-3 has been incapable of communicating with an AP for wireless LAN communication. For example, the switching event recognition unit 273 continuously confirms whether the mobile communication terminal 200-3 can communicate with the AP 31. When the mobile communication terminal 200-3 becomes incapable of communicating with the AP 31, the switching event recognition unit 273 recognizes that the mobile communication terminal 200-3 has been incapable of communicating with the AP 31.

As described above, the switching event recognition unit 273 recognizes occurrence of a switching event. When recognizing occurrence of a switching event, the switching event recognition unit 273 notifies the connection control unit 257 of the occurrence of the switching event.

(Connection Control Unit 275)

The connection control unit 275 causes the wireless LAN communication terminal 100-3 to switch connection to the network 30 through mobile communication and connection to the network 30 through wireless LAN communication in response to occurrence of a switching event. That is, the connection control unit 275 causes the wireless LAN communication terminal 100-3 to switch connection by tethering and connection through its own wireless LAN communication in response to occurrence of a switching event.

Switching Connection by Tethering to Connection Through Wireless LAN Communication For example, as described above, a switching event includes an event in which an AP for wireless LAN communication is detected. In this case, when the AP is detected, the connection control unit 275 causes the wireless LAN communication terminal 100-3 to switch connection to the network 30 through mobile communication to connection to the network 30 through wireless LAN communication.

More specifically, for example, when the switching event recognition unit 273 notifies the connection control unit 275 that the AP 31 has been detected, the connection control unit 275 notifies the wireless LAN communication terminal 100-3 via the wireless LAN communication unit 220 that the AP 31 has been detected. Thereafter, the wireless LAN communication terminal 100-3 performs an authentication procedure (such as an EAP-SIM authentication procedure) for connection to the network 30 through wireless LAN communication, and connects to the network 30 through wireless LAN communication. In this way, for example, the connection control unit 275 causes the wireless LAN communication terminal 100-3 to switch ways of connection.

Additionally, the connection control unit 275 does not have to notify the wireless LAN communication terminal 100-3 that the AP 31 has been detected, but may issue an instruction to the wireless LAN communication terminal 100-3 such that connection is switched to connection through wireless LAN communication, instead.

Switching Connection Through Wireless LAN Communication to Connection by Tethering For example, as described above, a switching event includes an event in which the mobile communication terminal 200-3 becomes incapable of communicating with an AP for wireless LAN communication. In this case, when the mobile communication terminal 200-3 becomes incapable of communicating with an AP for wireless LAN communication, the connection control unit 275 causes the wireless LAN communication terminal 100-3 to switch connection to the network 30 through wireless LAN communication to connection to the network 30 through mobile communication.

More specifically, for example, when the switching event recognition unit 273 notifies the connection control unit 275 that the mobile communication terminal 200-3 has been incapable of communicating with the AP 31, the connection control unit 275 issues an instruction to the wireless LAN communication terminal 100-3 via the wireless LAN communication unit 220 such that connection is switched to connection by tethering. The connection control unit 275 also causes the tethering control unit 271 to permit connection of the wireless LAN communication terminal 100-3 by tethering. Thereafter, the wireless LAN communication terminal 100-3 connects to the network 30 by tethering. In this way, for example, the connection control unit 275 causes the wireless LAN communication terminal 100-3 to switch ways of connection.

Additionally, the connection control unit 275 does not have to issue an instruction to the wireless LAN communication terminal 100-3 such that connection is switched to connection by tethering, but may issue a notification that the mobile communication terminal 200-3 has been incapable of communicating with an AP for wireless LAN communication, instead.

In addition, the connection control unit 275 does not have to cause the tethering control unit 271 to permit connection of the wireless LAN communication terminal 100-3, but the wireless LAN communication terminal 100-3 may request connection by tethering from the mobile communication terminal 200-3, instead.

<5.3. Process Flow>

Next, with reference to FIGS. 15 and 16, an example of a communication control process according to the third embodiment will be described.

(Switching Connection by Tethering to Connection Through Wireless LAN Communication)

FIG. 15 is a sequence diagram illustrating an example schematic flow of a first communication control process according to the third embodiment. The first communication control process is performed when connection by tethering is switched to connection through wireless LAN communication.

First of all, the mobile communication terminal 200-3 performs mobile communication (S601).

The connection control unit 151 of the wireless LAN communication terminal 100-3 requests connection by tethering from the mobile communication terminal 200-3 via the wireless LAN communication unit 110 (S603). Subsequently, the tethering control unit 271 of the mobile communication terminal 200-3 permits connection by tethering to the wireless LAN communication terminal 100-3 (S605). Thereafter, the wireless LAN communication terminal 100-3 and the mobile communication terminal 200-3 perform communication by tethering (S607).

Thereafter, when the mobile communication terminal 200-3 approaches the AP 31 at any given timing, the control unit 270 of the mobile communication terminal 200-3 detects the AP 31 (S609). The switching event recognition unit 273 of the mobile communication terminal 200-3 recognizes that the AP 31 has been detected. Subsequently, the connection control unit 275 of the mobile communication terminal 200-3 notifies the wireless LAN communication terminal 100-3 via the wireless LAN communication unit 220 that the AP 31 has been detected (step S611).

The connection control unit 143 of the wireless LAN communication terminal 100-3 issues an instruction to the authentication processing unit 133 such that an authentication procedure for connection to the network 30 through wireless LAN communication is performed. Subsequently, the authentication processing unit 133 performs an EAP-SIM authentication procedure along with the mobile communication terminal 200-3 and the RADIUS server 33 (with which communication is performed via the AP 31) (step S613). The authentication procedure is the same as described in the first embodiment with reference to FIG. 8.

Thereafter, if the authentication succeeds, the wireless LAN communication terminal 100-3 connects to the network 30 through wireless LAN communication and performs wireless LAN communication (S615).

(Switching Connection Through Wireless LAN Communication to Connection by Tethering)

FIG. 16 is a sequence diagram illustrating an example schematic flow of a second communication control process according to the third embodiment. The second communication control process is performed when connection through wireless LAN communication is switched to connection by tethering.

First of all, the mobile communication terminal 200-3 performs mobile communication (S631). Meanwhile, the wireless LAN communication terminal 100-3 performs wireless LAN communication (S633).

Thereafter, the mobile communication terminal 200-3 becomes incapable of communicating with an AP 31 at any given timing (S635). Subsequently, the switching event recognition unit 273 of the mobile communication terminal 200-3 recognizes that the mobile communication terminal 200-3 has been incapable of communicating with the AP 31. Wireless LAN communication of the wireless LAN communication terminal 100-3 positioned in the vicinity of the mobile communication terminal 200-3 is disconnected from the AP 31 (S637). The connection control unit 275 of the mobile communication terminal 200-3 also issues an instruction to the wireless LAN communication terminal 100-3 via the wireless LAN communication unit 220 such that connection is switched to connection by tethering (S639). The connection control unit 275 causes the tethering control unit 271 to permit connection of the wireless LAN communication terminal 100-3 by tethering.

The connection control unit 151 of the wireless LAN communication terminal 100-3 connects the wireless LAN communication terminal 100-3 to the network 30 by tethering. Thereafter, the wireless LAN communication terminal 100-3 and the mobile communication terminal 200-3 perform communication by tethering (S641).

As above, the third embodiment according to the present disclosure has been described. According to the third embodiment, the wireless LAN communication terminal 100 is controlled to connect to the network 30 by tethering, or to connect to the network 30 through wireless LAN communication, as described in the second embodiment. It hereby becomes possible to maintain connection of the wireless LAN communication terminal 100 to the network 30.

6. FOURTH EMBODIMENT

Next, with reference to FIGS. 17 to 20, a fourth embodiment of the present disclosure will be described. According to the fourth embodiment of the present disclosure, it becomes possible to reduce increase in power consumption of communication between the wireless LAN communication terminal 100 and the mobile communication terminal 200.

<6.1. Configuration of Wireless LAN Communication Terminal>

With reference to FIG. 17, an example configuration of a wireless LAN communication terminal 100-4 according to the fourth embodiment will be described. FIG. 17 is a block diagram illustrating the example configuration of the wireless LAN communication terminal 100-4 according to the fourth embodiment. With reference to FIG. 17, the wireless LAN communication terminal 100-4 includes a wireless LAN communication unit 110, a storage unit 120, and a control unit 160.

Here, there is no difference between the first embodiment and the fourth embodiment with respect to the wireless LAN communication unit 110 and the storage unit 120, and the authentication information acquisition unit 131 and the authentication processing unit 133 of the control unit 160. Accordingly, a power control unit 161 of the control unit 160 will be here described.

(Power Control Unit 161)

The power control unit 161 sets a communication mode for communication between the wireless LAN communication terminal 100-4 and a mobile communication terminal 200-4 to a low power consumption mode while an authentication procedure for connection to the network 30 through wireless LAN communication is not being performed.

As described above, for example, the authentication procedure is an EAP-SIM authentication procedure. For example, the communication is directly connected wireless LAN communication between the wireless LAN communication terminal 100-4 and the mobile communication terminal 200-4.

For example, the power control unit 161 shifts the communication mode for the directly connected wireless LAN communication from the low power consumption mode to the normal mode in the wireless LAN communication terminal 100-4 before starting an EAP-SIM authentication procedure. The power control unit 161 shifts the communication mode from the normal mode to the low power consumption mode in the wireless LAN communication terminal 100-4 after finishing the EAP-SIM authentication procedure.

For example, the low power consumption mode consumes less power than the normal mode, in which communication can be constantly performed. As an example, the wireless LAN communication terminal 100-4 may stop the directly connected wireless LAN communication in the low power consumption mode. As another example, the wireless LAN communication terminal 100-4 may transmit fewer types of control signals in the directly connected wireless LAN communication in the low power consumption mode than in the normal mode, or may transmit the control signals less frequently in the low power consumption mode than in the normal mode.

The communication mode in the wireless LAN communication terminal 100-4 is shifted in this way. It hereby becomes possible to reduce increase in power consumed for the wireless LAN communication terminal 100-4 to perform communication between the wireless LAN communication terminal 100-4 and the mobile communication terminal 200-4.

For example, before starting and after finishing an EAP-SIM authentication procedure, the power control unit 161 issues an instruction to the mobile communication terminal 200-4 via the wireless LAN communication unit 110 such that the communication mode for the directly connected wireless LAN communication is shifted.

Such an instruction for shifting the communication mode makes it possible to reduce increase in power consumed for the mobile communication terminal 200-4 to perform communication between the wireless LAN communication terminal 100-4 and the mobile communication terminal 200-4.

For example, the authentication procedure is performed when the wireless LAN communication terminal 100-4 newly connects to an AP 31. That is, the authentication procedure is performed when the wireless LAN communication terminal 100-4 establishes initial connection to any AP 31, or when the wireless LAN communication terminal 100-4 switches connection to connect to another AP 31. For example, the authentication procedure is also performed when a network issues the instruction.

For example, the power control unit 161 shifts the communication mode from the low power consumption mode to the normal mode when communication is necessary, even while an EAP-SIM authentication procedure is not being performed. Additionally, in this case, the power control unit 161 may issue an instruction to the mobile communication terminal 200-4 via the wireless LAN communication unit 110 such that the communication mode for the directly connected wireless LAN communication is shifted.

<6.2. Configuration of Mobile Communication Terminal>

Next, with reference to FIG. 18, an example configuration of the mobile communication terminal 200-4 according to the fourth embodiment will be described. FIG. 18 is a block diagram illustrating the example configuration of the mobile communication terminal 200-4 according to the fourth embodiment. With reference to FIG. 18, the mobile communication terminal 200-4 includes a mobile communication unit 210, a wireless LAN communication unit 220, an SIM 230, a storage unit 240, and a control unit 280.

Here, there is no difference between the first embodiment and the fourth embodiment with respect to the mobile communication unit 210, the wireless LAN communication unit 220, the SIM 230 and the storage unit 240, and the authentication information providing unit 251 of the control unit 280. Accordingly, a power control unit 281 of the control unit 280 will be here described.

(Power Control Unit 281)

The power control unit 281 sets a communication mode for communication between the wireless LAN communication terminal 100-4 and the mobile communication terminal 200-4 to a low power consumption mode while an authentication procedure for connection to the network 30 through wireless LAN communication is not being performed.

As described above, for example, the authentication procedure is an EAP-SIM authentication procedure. For example, the communication is directly connected wireless LAN communication between the wireless LAN communication terminal 100-4 and the mobile communication terminal 200-4.

For example, before starting an EAP-SIM authentication procedure, the power control unit 281 shifts the communication mode for the directly connected wireless LAN communication from the low power consumption mode to a normal mode in the mobile communication terminal 200-4. After finishing the EAP-SIM authentication procedure, the power control unit 281 shifts the communication mode from the normal mode to the low power consumption mode in the mobile communication terminal 200-4.

For example, the low power consumption mode consumes less power than the normal mode, in which communication can be constantly performed. As an example, the mobile communication terminal 200-4 may transmit fewer types of control signals in the low power consumption mode than in the normal mode. For example, only a beacon may be transmitted, and the other control signals including Keep Alive may not be transmitted in the low power consumption mode. As another example, the mobile communication terminal 200-4 may transmit the control signals less frequently in the low power consumption mode than in the normal mode. As still another example, the mobile communication terminal 200-4 may stop the directly connected wireless LAN communication in the low power consumption mode.

The communication mode in the mobile communication terminal 200-4 is shifted in this way. It hereby becomes possible to reduce increase in power consumed for the mobile communication terminal 200-4 to perform communication between the wireless LAN communication terminal 100-4 and the mobile communication terminal 200-4.

Before starting and after finishing an EAP-SIM authentication procedure, the power control unit 281 may issue an instruction to the wireless LAN communication terminal 100-4 via the wireless LAN communication unit 220 such that the communication mode for the directly connected wireless LAN communication is shifted.

Such an instruction for shifting the communication mode makes it possible to reduce increase in power consumed for the wireless LAN communication terminal 100-4 to perform communication between the wireless LAN communication terminal 100-4 and the mobile communication terminal 200-4.

For example, the power control unit 281 shifts the communication mode from the low power consumption mode to the normal mode when communication is necessary, even while an EAP-SIM authentication procedure is not being performed. Additionally, in this case, the power control unit 281 may issue an instruction to the wireless LAN communication terminal 100-4 via the wireless LAN communication unit 220 such that the communication mode for the directly connected wireless LAN communication is shifted.

<6.3. Process Flow>

Next, with reference to FIGS. 19 to 20, an example of a communication control process according to the fourth embodiment will be described.

(Process in Case where Authentication Procedure is Necessary)

FIG. 19 is a sequence diagram illustrating an example schematic flow of a first communication control process according to the fourth embodiment. The first communication control process is performed when an EAP-SIM authentication procedure is necessary.

First of all, the control unit 160 of the wireless LAN communication terminal 100-4 detects an AP 31 (S701). Subsequently, the authentication processing unit 133 of the wireless LAN communication terminal 100-4 performs an EAP-SIM authentication procedure along with the mobile communication terminal 200-4 and the RADIUS server 33 (with which communication is performed via the AP 31) (step S703). The authentication procedure is the same as described in the first embodiment with reference to FIG. 8.

After finishing the EAP-SIM authentication procedure, the power control unit 161 issues an instruction to the mobile communication terminal 200-4 such that a communication mode for directly connected wireless LAN communication between the wireless LAN communication terminal 100-4 and the mobile communication terminal 200-4 is shifted (step S705). Subsequently, the power control unit 281 of the mobile communication terminal 200-4 shifts the communication mode for the directly connected wireless LAN communication from a normal mode to a low power consumption mode in the mobile communication terminal 200-4 (step S707). The power control unit 161 of the wireless LAN communication terminal 100-4 shifts the communication mode for the directly connected wireless LAN communication from the normal mode to the low power consumption mode in the wireless LAN communication terminal 100-4 (step S709).

If the authentication succeeds, the wireless LAN communication terminal 100-4 connects to the network 30 through wireless LAN communication and performs wireless LAN communication (S711).

Thereafter, an event (that is namely an authentication event) in which an EAP-SIM authentication procedure is necessary occurs at any given timing, and the control unit 160 of the wireless LAN communication terminal 100-4 recognizes the occurrence of the authentication event (S713). As an example, the authentication event is an event in which the wireless LAN communication terminal 100-4 switches connection to connect to another AP 31.

The power control unit 161 of the wireless LAN communication terminal 100-4 shifts the communication mode for the directly connected wireless LAN communication from the low power consumption mode to the normal mode in the wireless LAN communication terminal 100-4 (step S715). The power control unit 161 issues an instruction to the mobile communication terminal 200-4 such that the communication mode for the directly connected wireless LAN communication is shifted (step S717). Subsequently, the power control unit 281 of the mobile communication terminal 200-4 shifts the communication mode for the directly connected wireless LAN communication from the low power consumption mode to the normal mode in the mobile communication terminal 200-4 (step S719).

Thereafter, the authentication processing unit 133 of the wireless LAN communication terminal 100-4 performs an EAP-SIM authentication procedure along with the mobile communication terminal 200-4 and the RADIUS server 33 (with which communication is performed via the AP 31) (step S721).

(Process in Case where Communication is Necessary in Process Other than Authentication Procedure)

FIG. 20 is a sequence diagram illustrating an example schematic flow of a second communication control process according to the fourth embodiment. The second communication control process is performed when communication is necessary between the wireless LAN terminal 100-4 and the mobile communication terminal 200-4 in a procedure other than the EAP-SIM authentication procedure.

Here, steps S731 to S741 in the second communication control process correspond to steps S701 to S711 in the first communication control process described with reference to FIG. 19. Accordingly, steps other than step S743 of the steps illustrated in FIG. 20 will be here described.

The control unit 280 of the mobile communication terminal 200-4 recognizes that communication with the wireless LAN communication terminal 100-4 is necessary (S743). For example, the control unit 280 recognizes that update of a status (which will be referred to as "status update," hereinafter) of the wireless LAN communication terminal 100-4 is necessary to be reported to the control unit 280.

The power control unit 281 of the mobile communication terminal 200-4 shifts a communication mode for directly connected wireless LAN communication between the wireless LAN communication terminal 100-4 and the mobile communication terminal 200-4 from a low power consumption mode to a normal mode in the mobile communication terminal 200-4 (step S745).

The power control unit 281 of the mobile communication terminal 200-4 issues an instruction to the wireless LAN communication terminal 100-4 such that the communication mode for the directly connected wireless LAN communication is shifted (step S747). Thereafter, the power control unit 161 of the wireless LAN communication terminal 100-4 shifts the communication mode for the directly connected wireless LAN communication from the low power consumption mode to the normal mode in the wireless LAN communication terminal 100-4 (step S749).

The control unit 280 of the mobile communication terminal 200-4 issues an instruction to the wireless LAN communication terminal 100-4 via the wireless LAN communication unit 220 such that the status update is reported. Subsequently, the control unit 160 of the wireless LAN communication 100-4 reports the status update to the mobile communication terminal 200-4 via the wireless LAN communication unit 110.

Thereafter, the power control unit 161 of the wireless LAN communication terminal 100-4 issues an instruction to the mobile communication terminal 200-4 such that the communication mode for the directly connected wireless LAN communication is shifted (step S755). Subsequently, the power control unit 281 of the mobile communication terminal 200-4 shifts the communication mode for the directly connected wireless LAN communication from the normal mode to the low power consumption mode in the mobile communication terminal 200-4 (step S757). The power control unit 161 of the wireless LAN communication terminal 100-4 shifts the communication mode for the directly connected wireless LAN communication from the normal mode to the low power consumption mode in the wireless LAN communication terminal 100-4 (step S759).

As above, the fourth embodiment according to the present disclosure has been described. According to the fourth embodiment, a communication mode for communication between the wireless LAN communication terminal 100 and the mobile communication terminal 200 is set to a low power consumption mode while an authentication procedure is not being performed. It hereby becomes possible to reduce increase in power consumption of communication between the wireless LAN communication terminal 100 and the mobile communication terminal 200.

7. FIFTH EMBODIMENT

Next, with reference to FIGS. 21 to 23, a fifth embodiment of the present disclosure will be described. According to the fifth embodiment of the present disclosure, even when the mobile communication terminal 200 allows another apparatus to use the SIM 230, it becomes possible to enhance security.

Additionally, a configuration of a wireless LAN communication terminal 100-5 according to the fifth embodiment is the same as the configuration of the wireless LAN communication terminal 100-1 according to the first embodiment.

<7.1. Configuration of Mobile Communication Terminal>

First of all, with reference to FIG. 21, an example configuration of a mobile communication terminal 200-5 according to the fifth embodiment will be described. FIG. 21 is a block diagram illustrating the example configuration of the mobile communication terminal 200-5 according to the fifth embodiment. With reference to FIG. 21, the mobile communication terminal 200-5 includes a mobile communication unit 210, a wireless LAN communication unit 220, an SIM 230, a storage unit 240, and a control unit 290.

Here, there is no difference between the first embodiment and the fifth embodiment with respect to the mobile communication unit 210, the wireless LAN communication unit 220, the SIM 230 and the storage unit 240, and the authentication information providing unit 251 of the control unit 290. Accordingly, a connection-disabling processing unit 291 of the control unit 290 will be here described.

(Connection-Disabling Processing Unit 291)

The connection-disabling processing unit 291 performs a connection-disabling procedure for disabling connection of the wireless LAN communication terminal 100-5 to the network 30 through wireless LAN communication in response to occurrence of a predetermined event (which will be referred to as a "connection-disabling event," hereinafter).

Request to Disable Connection

For example, when a connection-disabling event occurs, the connection-disabling processing unit 291 recognizes the occurrence of the connection-disabling event and requests that connection of the wireless LAN communication terminal 100-5 to the network 30 is disabled. As an example, the connection-disabling processing unit 291 requests a control server that controls an AP 31 to disable connection of the wireless LAN communication terminal 100-5 to the network 30. The server requests an AP 31 to disable the connection. As a result, the AP 31 stops wireless LAN communication with the wireless LAN communication terminal 100-5, and the wireless LAN communication terminal 100-5 is disconnected from the network 30.

For example, the connection-disabling processing unit 291 requests the control server through mobile communication to disable the connection. That is, the connection-disabling processing unit 291 requests the control server via the mobile communication unit 210 (that is namely the BS 41) to disable the connection.

For example, the connection-disabling processing unit 291 receives a report of status update from the wireless LAN communication terminal 100-5, and recognizes the AP 31 in wireless LAN communication with the wireless LAN communication terminal 100-5. Upon requesting the connection to be disabled, the connection-disabling processing unit 291 notifies a control server of the AP 31 in wireless LAN communication with the wireless LAN communication terminal 100-5. The control server can hereby request the AP 31 in wireless LAN communication with the wireless LAN communication terminal 100-5 to disable the connection.

As described above, connection of the wireless LAN communication terminal 100-5 to the network 30 through wireless LAN communication is disabled. It hereby becomes possible to enhance security more even when the mobile communication terminal 200-5 allows another apparatus to use the SIM 230. For example, even if the wireless LAN communication terminal 100-5 uses the SIM 230 of the mobile communication terminal 200-5 to connect to the network 30 and the connection is not desirable, the connection is retroactively disabled. As a result, it is possible to prevent the wireless LAN communication terminal 100-5, which has been using the SIM 230, from performing unauthorized communication.

Additionally, the connection-disabling processing unit 291 may request the control server through wireless LAN communication to disable the connection. That is, the connection-disabling processing unit 291 may request the control server via the wireless LAN communication unit 220 (that is namely the AP 31) to disable the connection.

The connection-disabling processing unit 291 does not have to request the control server to disable the connection, but may directly request the AP 31 to disable the connection, instead. The AP 31 may stop wireless LAN communication with the wireless LAN communication terminal 100-5, and the wireless LAN communication terminal 100-5 may be consequently disconnected from the network 30. In this case, the connection-disabling processing unit 291 may also request the AP 31 through wireless LAN communication to disable the connection, or may request the AP 31 through mobile communication to disable the connection.

Connection-Disabling Event

As an example, the connection-disabling event includes an event in which the mobile communication terminal 200-5 and the wireless LAN communication terminal 100-5 become incapable of communicating with each other. That is, when the mobile communication terminal 200-5 and the wireless LAN communication terminal 100-5 have been incapable of communicating with each other, the connection-disabling processing unit 291 performs a connection-disabling procedure for disabling connection of the wireless LAN communication terminal 100-5 to the network 30 through wireless LAN communication.

For example, the connection-disabling processing unit 291 continuously confirms whether the mobile communication terminal 200-5 can communicate with the wireless LAN communication terminal 100-5. When the mobile communication terminal 200-5 becomes incapable of communicating with the wireless LAN communication terminal 100-5 (for a predetermined time or more, for example), the connection-disabling unit 291 performs a connection-disabling procedure.

Connection is disabled in this way in response to occurrence of a connection-disabling event. Accordingly, if the wireless LAN communication terminal 100-5 connects to the network 30 by use of the SIM 230 and the wireless LAN communication terminal 100-5 moves away from the mobile communication terminal 200-5, the connection is disabled. That is, connection of the wireless LAN communication terminal 100-5 to the network 30 is continued under the condition that the wireless LAN communication terminal 100-5 is positioned in the vicinity of the mobile communication terminal 200-5. For example, it hereby becomes possible to prevent a malicious third person, who is different from a user of the mobile communication terminal 200-5, from using the wireless LAN communication terminal 100-5 away from the mobile communication terminal 200-5 (and the user thereof) to perform unauthorized communication.

For example, an apparatus of the malicious third person may use the SIM 230 of the mobile communication terminal 200-5, and can connect to the network 30. In this case, once the apparatus of the malicious third person (or the malicious third person) moves away from the mobile communication terminal 200-5 (or the user thereof), connection established by the apparatus of the malicious third person is disabled. It is therefore possible to prevent the apparatus of the malicious third person, which has been using the SIM 230, from performing unauthorized communication.

For example, if the user of the mobile communication terminal 200-5 is also a user of the wireless LAN communication terminal 100-5, the user may probably move away with the mobile communication terminal 200-5 from the wireless LAN communication terminal 100-5. In this case, connection of the wireless LAN communication terminal 100-5, which has been using the SIM 230, to the network 30 is disabled. It is therefore possible to prevent the malicious third person from illegally using the wireless LAN communication terminal 100-5 to perform communication.

Additionally, as another example, the connection-disabling event may include an event in which a predetermined user operation for performing a connection-disabling procedure is detected. That is, when the predetermined user operation for performing a connection-disabling procedure is detected, the connection-disabling processing unit 291 may perform the connection-disabling procedure for disabling connection of the wireless LAN communication terminal 100-5 to the network 30 through the wireless LAN communication.

Connection is disabled in this way in response to occurrence of a connection-disabling event. Accordingly, when a user of the mobile communication terminal 200-5 determines that connection of the wireless LAN communication terminal 100-5 to the network 30 is not desirable, the user can disable the connection by a user operation. As an example, when connection of the wireless LAN communication terminal 100-5 to the network 30 is not necessary, the user of the mobile communication terminal 200-5 can disable the connection. As another example, when a fraud of a third person or a misoperation of a user allows the wireless LAN communication terminal 100-5 to connect to the network 30 by use of the SIM 230, the user of the mobile communication terminal 200-5 can disable the connection. It is therefore possible to prevent a malicious third person from using the wireless LAN communication terminal 100-5 to perform unauthorized communication.

Request to Forbid Reconnection

For example, the connection-disabling procedure may include not only a procedure for requesting connection of the wireless LAN communication terminal 100-5 to the network 30 through wireless LAN communication to be disabled, but also a procedure for requesting reconnection of the wireless LAN communication terminal 100-5 to the network 30 through wireless LAN communication to be forbidden. That is, the connection-disabling processing unit 291 may request reconnection of the wireless LAN communication terminal 100-5 to the network 30 through the wireless LAN communication to be forbidden.

For example, the connection-disabling processing unit 291 may request the connection to be disabled, and the reconnection to be forbidden. As a result, reconnection of the wireless LAN communication terminal 100-5 to the network 30 through wireless LAN communication is forbidden (by the AP 31, a control server of the AP 31, or the RADIUS server 33, for example). Reconnection to be forbidden may include connection via the AP 31 in wireless LAN communication with the wireless LAN communication terminal 100-5, or connection via all the APs 31.

Reconnection is forbidden in this way. Accordingly, unauthorized connection of the wireless LAN communication terminal 100-5 to the network 30 can be continuously prevented.

Additionally, the connection-disabling processing unit 291 may separately request that the connection be disabled and the reconnection be forbidden. For example, the connection-disabling processing unit 291 may request a given apparatus (such as an AP 31) to disable the connection, while the connection-disabling processing unit 291 may request another apparatus (such as a control server of the AP 31) to forbid the reconnection. For example, the connection-disabling processing unit 291 may request the connection to be disabled in response to occurrence of a connection-disabling event, while the connection-disabling processing unit 291 may also request the reconnection to be forbidden as an option (in the case where a user of the motion communication terminal 200-5 issues the instruction, for example).

<7.2. Process Flow>

Next, with reference to FIGS. 22 and 23, an example of a communication control process according to the fifth embodiment will be described.

(Requesting Control Server of AP 31 to Disable Connection)

FIG. 22 is a sequence diagram illustrating an example schematic flow of a first communication control process according to the fifth embodiment. The first communication control process is performed when a control server of an AP 31 is requested to disable connection.

First of all, when the wireless LAN communication terminal 100-5 approaches an AP 31, the control unit 130 of the wireless LAN communication terminal 100-5 detects the AP 31 (S801). Subsequently, the authentication processing unit 133 of the wireless LAN communication terminal 100-5 performs an EAP-SIM authentication procedure along with the mobile communication terminal 200-5 and the RADIUS server 33 (with which communication is performed via the AP 31) (step S803). The authentication procedure is the same as described in the first embodiment with reference to FIG. 8. If the authentication succeeds, the wireless LAN communication terminal 100-5 connects to the network 30 through wireless LAN communication and performs wireless LAN communication (S805).

Thereafter, the control unit 130 of the wireless LAN communication terminal 100-5 reports status update to the mobile communication terminal 200-5 via the wireless LAN communication unit 110 (S807).

Thereafter, a connection-disabling event occurs at any given timing, and the connection-disabling processing unit 291 recognizes the occurrence of the connection-disabling event (S809). The connection-disabling processing unit 291 requests the control server of the AP 31 via the mobile communication unit 210 to disable connection of the wireless LAN communication terminal 100-5 to the network 30 (S811).

The control server requests the AP 31 to disable the connection (S813). As a result, the AP 31 stops the wireless LAN communication with the wireless LAN communication terminal 100-5, and the wireless LAN communication terminal 100-5 is disconnected from the network 30 (S815).

(Requesting AP 31 to Disable Connection)

FIG. 23 is a sequence diagram illustrating an example schematic flow of a second communication control process according to the fifth embodiment. The second communication control process is performed when an AP 31 is requested to disable connection.

Here, steps S801 to S809 in the second communication control process are the same as the first communication control process described with reference to FIG. 22. Accordingly, steps following step S821 of the steps illustrated in FIG. 23 will be here described.

The connection-disabling processing unit 291 requests, via the wireless LAN communication unit 220, an AP 31 in wireless LAN communication with the wireless LAN communication terminal 100-5 to disable connection of the wireless LAN communication terminal 100-5 to the network 30 (S821). As a result, the AP 31 stops the wireless LAN communication with the wireless LAN communication terminal 100-5, and the wireless LAN communication terminal 100-5 is disconnected from the network 30 (S823).

As above, the fifth embodiment according to the present disclosure has been described. According to the fifth embodiment, a connection-disabling procedure is performed in response to occurrence of a connection-disabling event for disabling connection of the wireless LAN communication terminal 100-5 to the network 30 through wireless LAN communication. It hereby becomes possible to further enhance security even when the mobile communication terminal 200 allows another apparatus to use the SIM 230. For example, when the wireless LAN communication terminal 100 uses the SIM 230 of the mobile communication terminal 200 to connect to the network 30 and the connection is not desirable, the connection is retroactively disabled. As a result, it becomes possible to prevent the wireless LAN communication terminal 100, which has been using the SIM 230, from performing unauthorized communication.

8. CONCLUSION

So far, with reference to FIGS. 1 to 23, the communication apparatuses and the processes according to the embodiments of the present disclosure have been described. According to the embodiments (especially the first embodiment) of the present disclosure, the wireless LAN communication terminal 100 performs an authentication procedure for connection to a network through wireless LAN communication, by use of authentication information provided by the SIM 230 of the mobile communication terminal 200. That is, the wireless LAN communication terminal 100 uses the SIM 230 of the mobile communication terminal 200 to perform an authentication procedure.

It hereby becomes possible to save trouble of a user of the wireless LAN communication terminal 100 that does not perform mobile communication in a mobile communication service when the wireless LAN communication terminal 100 connects to the network 30, and to reduce increase in power consumption of the mobile communication terminal 200.

For example, according to the second embodiment and the third embodiment of the present disclosure, the wireless LAN communication terminal 100 is controlled to connect to the network 30 by tethering, or to connect to the network 30 through wireless LAN communication.

It hereby becomes possible to maintain connection of the wireless LAN communication terminal 100 to the network 30.

For example, according to the fourth embodiment of the present disclosure, a communication mode for communication between the wireless LAN communication terminal 100 and the mobile communication terminal 200 is set to a low power consumption mode while an authentication procedure is not being performed.

It hereby becomes possible to reduce increase in power consumption of communication between the wireless LAN communication terminal 100 and the mobile communication terminal 200.

For example, according to the fifth embodiment of the present disclosure, a connection-disabling procedure is performed in response to occurrence of a connection-disabling event for disabling connection of the wireless LAN communication terminal 100-5 to the network 30 through wireless LAN communication.

It hereby becomes possible to enhance security more even when the mobile communication terminal 200 allows another apparatus to use the SIM 230. For example, even if the wireless LAN communication terminal 100 connects to the network 30 by use of the SIM 230 of the mobile communication terminal 200 and the connection is not desirable, the connection is retroactively disabled. As a result, it is possible to prevent the wireless LAN communication terminal 100, which has been using the SIM 230, from performing unauthorized communication.

It should be understood by those skilled in the art that various modifications, combinations, sub-combinations and alterations may occur depending on design requirements and other factors insofar as they are within the scope of the appended claims or the equivalents thereof.

For example, it has been described that the wireless LAN communication terminal is a tablet terminal. However, the embodiments of the present disclosure are not limited thereto. The wireless LAN communication terminal may also be another terminal apparatus (such as a PC, a portable game device, a digital camera, a printer, and a wireless LAN communication card) that does not perform mobile communication, but wireless LAN communication.

It has also been described that the mobile communication terminal is a smartphone. However, the embodiments of the present disclosure are not limited thereto. The mobile communication terminal may also be another terminal apparatus (such as a tablet terminal and a mobile communication card) that performs mobile communication in a mobile communication service.

It has been described that the wireless LAN communication terminal and the mobile communication terminal perform directly connected wireless LAN communication. However, the embodiments of the present disclosure are not limited thereto. The wireless LAN communication terminal and the mobile communication terminal may also perform another type of communication. As an example, the wireless LAN communication terminal and the mobile communication terminal may perform communication in Bluetooth (registered trademark) instead of wireless LAN communication. In this case, the mobile communication terminal does not have to include a wireless LAN communication unit.

It has also been described that the authentication server is an RADIUS server. The embodiments of the present disclosure are not limited thereto. The authentication server may also be another apparatus (such as an authentication, authorization, and accounting (AAA) server) that performs authentication.

It has been described that the authentication performed by use of an SIM is EAP-SIM authentication. However, the embodiments of the present disclosure are not limited thereto. The authentication performed by use of an SIM may also be authentication according to another protocol.

It has been described that wireless communication which is different from mobile communication is the wireless LAN communication, and a terminal apparatus that performs an authentication procedure by use of an SIM (such as a UICC) of a mobile communication terminal is the wireless LAN communication terminal. However, the embodiments of the present disclosure are not limited thereto. The wireless communication that is different from the mobile communication may also be wireless communication other than the wireless LAN communication. The terminal apparatus that performs the authentication procedure may also be an apparatus that performs wireless communication other than the wireless LAN communication.

It has been described that the SIM is a UICC. However, the embodiments of the present disclosure are not limited thereto. For example, the SIM may also be another type of a module or a card that has subscriber identity information and performs an authentication process.

It has been described that the terminal apparatus which performs the authentication procedure is an apparatus which performs wireless communication (such as wireless LAN communication). However, the embodiments of the present disclosure are not limited thereto. For example, the terminal apparatus that performs the authentication procedure may also be an apparatus (such as a PC) connected to another apparatus (such as a wireless LAN communication card) that performs wireless communication (such as wireless LAN communication).

The process steps described herein in the communication control processes do not necessarily have to be executed in chronological order described in the flowcharts. For example, the process steps in the communication control processes may be executed in different order from the order described in the flow charts, or may also be executed in parallel.

A computer program for performing a function corresponding to each structural element of a terminal apparatus (such as a wireless LAN communication apparatus and a mobile communication apparatus) can be created in hardware such as a CPU, ROM and RAM built in the terminal apparatus. There is also provided a storage medium having the computer program stored therein.

Additionally, the present technology may also be configured as below.

(A1)

A method, comprising acts of:

(a) communicating authentication information comprising mobile subscriber information of a mobile communication terminal to a server; and (b) further communicating with the server to perform an authentication procedure to enable a wireless LAN communication terminal separate from the mobile communication terminal to connect to a network via wireless LAN communication with an access point separate from the mobile communication terminal.

(A2)

The method of (A1), wherein acts (a) and (b) are performed by the wireless LAN communication terminal.

(A3)

The method of (A2), further comprises an act of:

with the wireless LAN communication terminal, receiving the authentication information from the mobile communication terminal.

(A4)

The method of (A3), further comprising an act of:

with the wireless LAN communication terminal, receiving an identity request from the access point; and with the wireless LAN communication terminal, communicating the identity request to the mobile communication terminal.

(A5) The method of any of (A1)-(A4), further comprising acts of:

in response to detecting the occurrence of a switching event, switching a communication mode of the wireless LAN communication terminal between a first mode in which the wireless LAN communication terminal communicates with the network via wireless LAN communication with the access point and a second mode in which the wireless LAN communication terminal communicates with the network via a secondary network.

(A6) The method of (A5), wherein the secondary network comprises a mobile subscriber network to which the wireless LAN communication terminal is tethered.

(A7) The method of (A5) or (A6), wherein the switching event comprises a detection of insufficient wireless LAN communication with the access point, and the act of switching comprises switching from the first mode to the second mode.

(A8) The method of (A5) or (A6), wherein the switching event comprises a detection of sufficient wireless LAN communication with the access point, and the act of switching comprises switching from the second mode to the first mode.

(A9) The method of any of (A1)-(A8), wherein the mobile subscriber information comprises an IMSI.

(A10) The method of any of (A1)-(A9), wherein the authentication information further comprises a Nonce used for authentication of the network.

(A11) The method of any of (A1)-(A10), wherein the authentication information further comprises a message authentication code.

(A12) The method of any of (A1)-(A11), wherein the server comprises a RADIUS server.

(A13) The method of any of (A1)-(A12), wherein the authentication procedure comprises an EAP-SIM authentication protocol.

(A14) The method of any of (A1)-(A13), further comprising an act of: after performing the acts (a) and (b), shifting a communication mode for communication between the wireless LAN communication terminal and the mobile communication terminal to a low power consumption mode.

(A15) The method of (A14), wherein shifting the communication mode comprises shifting the mobile communication terminal to a low power consumption mode.

(A16) The method of any of (A1)-(A14), further comprising an act of:

with the wireless LAN communication terminal, after performing the acts (a) and (b), communicating an instruction to the mobile communication terminal to shift to a low power consumption mode. (A17) The method of any of (A1)-(A16), further comprising acts of:

in response to detecting a connection-disabling event, communicating a request to a control server to disable a connection of the wireless LAN communication terminal to the network.

(A18) The method of (A17), wherein the act of communicating the request to the control server is performed by the mobile communication terminal.

(B1) A method for operating a wireless LAN communication terminal, comprising an act of:

with the wireless LAN communication terminal, receiving authentication information comprising mobile subscriber information from a mobile communication terminal.

(B2) The method of (B1), further comprising an act of:

with the wireless LAN communication terminal, using the received authentication information to perform an authentication procedure to enable the wireless LAN communication terminal to connect to a network through wireless LAN communication with an access point.

(B3) The method of (B2), wherein the act of using the receive authentication information to perform the authentication procedure comprises communicating the received authentication information to a server.

(B4) The method of (B3), wherein the server comprises a RADIUS server.

(B5) The method of any of (B2)-(B4), further comprising an act of:

with the wireless LAN communication terminal, receiving an identity request from the access point; and with the wireless LAN communication terminal, communicating the identity request to the mobile communication terminal.

(B6) The method of any of (B2)-(B5), further comprising acts of:
in response to detecting the occurrence of a switching event, switching a communication mode of the wireless LAN communication terminal between a first mode in which the wireless LAN communication terminal communicates with the network via wireless LAN communication with the access point and a second mode in which the wireless LAN communication terminal communicates with the network via a secondary network.

(B7) The method of (B6), wherein the secondary network comprises a mobile subscriber network to which the wireless LAN communication terminal is tethered.

(B8) The method of (B6) or (B7), wherein the switching event comprises a detection of insufficient wireless LAN communication with the access point, and the act of switching comprises switching from the first mode to the second mode.

(B9) The method of (B6) or (B7), wherein the switching event comprises a detection of sufficient wireless LAN communication with the access point, and the act of switching comprises switching from the second mode to the first mode.

(B10) The method of any of (B1)-(B9), wherein the mobile subscriber information comprises an IMSI.

(B11) The method of any of (B2)-(B10), wherein the authentication information further comprises a Nonce used for authentication of the network.

(B12) The method of any of (B1)-(B11), wherein the authentication information further comprises a message authentication code.

(B13) The method of any of (B2)-(B12), wherein the authentication procedure comprises an EAP-SIM authentication protocol.

(B14) The method of any of (B2)-(B13), further comprising an act of:
after using the received authentication information to perform the authentication procedure, shifting a communication mode for communication between the wireless LAN communication terminal and the mobile communication terminal to a low power consumption mode.

(B15) The method of any of (B2)-(B14), further comprising an act of:
with the wireless LAN communication terminal, after using the received authentication information to perform the authentication procedure, communicating an instruction to the mobile communication terminal to shift to a low power consumption mode.

(C1) A method for operating a mobile communication terminal, comprising an act of: with the mobile communication terminal, communicating authentication information comprising mobile subscriber information to a wireless LAN communication terminal separate from the mobile communication terminal.

(C2) The method of (C1), further comprising an act of:
with the mobile communication terminal, further communicating with the wireless LAN communication terminal to allow the wireless LAN communication terminal to perform an authentication procedure using the authentication information to enable the wireless LAN communication terminal to connect to a network.

(C3) The method of (C2), wherein the act of further communicating with the wireless LAN communication terminal comprises receiving from the wireless LAN communication terminal at least one communication the wireless LAN communication terminal received from a server.

(C4) The method of (C3), wherein the server comprises a RADIUS server.

(C5) The method of (C3) or (C4), wherein the at least one communication comprises an identity request, and the method further comprises an act of:
communicating the subscriber information from the mobile communication terminal to the wireless LAN communication terminal in response to receiving the identity request.

(C6) The method of any of (C1)-(C5), wherein the mobile subscriber information comprises an IMSI.

(C7) The method of any of (C1)-(C6), wherein the authentication information further comprises a Nonce used for authentication of the network.

(C8) The method of any of (C1)-(C7), wherein the authentication information further comprises a message authentication code.

(C9) The method of any of (C2)-(C8), wherein the authentication procedure comprises an EAP-SIM authentication protocol.

(C10) The method of any of (C2)-(C9), further comprising an act of:
after further communicating with the wireless LAN communication terminal to allow the wireless LAN communication terminal to perform the authentication procedure, shifting the mobile communication terminal to a low power consumption mode.

(C11) The method of any of (C10), further comprising an act of:
receiving an instruction from the wireless LAN communication terminal to shift to a low power consumption mode.

(C12) The method of any of (C2)-(C11), further comprising an act of:
in response to detecting a connection-disabling event, communicating a request to a control server to disable a connection of the wireless LAN communication terminal to the network.

(C13) The method of (C12), wherein the act of communicating the request to the control server is performed by the mobile communication terminal.

(D1) A wireless LAN communication apparatus, comprising:
a wireless LAN communication unit configured to perform wireless LAN communication;
an authentication information acquisition unit configured to receive authentication information comprising mobile subscriber information from a mobile communication terminal; and
an authentication processing unit configured to use the received authentication information to perform an authentication procedure to enable the wireless LAN communication apparatus to connect to a network through wireless LAN communication with an access point.

(D2) The apparatus of (D1), wherein the authentication processing unit is further configured to communicate the received authentication information to a server.

(D3) The apparatus of (D2), in combination with the server, and wherein the server comprises a RADIUS server.

(D4) The apparatus of any of (D1)-(D3), wherein the authentication processing unit is further configured to receive an identity request from the access point, and to communicate the identity request to the mobile communication terminal.

(D5) The apparatus of any of (D1)-(D4), further comprising:
a switching event recognition unit configured to detect the occurrence of a switching event; and a connection control unit configured to switch a communication mode of the wireless LAN communication terminal between a first mode in which the wireless LAN communication apparatus communicates with the network via wireless LAN communication with the access point and a second mode in which the wireless LAN communication apparatus communicates with the network via a secondary network.

(D6) The apparatus of (D5), wherein the secondary network comprises a mobile subscriber network to which the wireless LAN communication apparatus is tethered.

(D7) The apparatus of (D5) or (D6), wherein the connection control unit is further configured to switch from the first mode to the second mode in response to the switching event recognition unit detecting an insufficient wireless LAN communication with the access point.

(D8) The apparatus of (D5) or (D6), wherein the connection control unit is further configured to switch from the second mode to the first mode in response to the switching event recognition unit detecting sufficient wireless LAN communication with the access point.

(D9) The apparatus of any of (D1)-(D8), wherein the mobile subscriber information comprises an IMSI.

(D10) The apparatus of any of (D1)-(D9), wherein the authentication information further comprises a Nonce used for authentication of the network.

(D11) The apparatus of any of (D1)-(D10), wherein the authentication information further comprises a message authentication code.

(D12) The apparatus of any of (D1)-(D11), wherein the authentication procedure comprises an EAP-SIM authentication protocol.

(D13) The apparatus of any of (D1)-(D12), further comprising:
a power control unit configured to shift a communication mode for communication between the wireless LAN communication apparatus and the mobile communication terminal to a low power consumption mode after the authentication processing unit has used the received authentication information to perform the authentication procedure.

(D14) The apparatus of any of (D1)-(D13), wherein the power control unit is configured to communicate an instruction to the mobile communication terminal to shift to a low power consumption mode.

(E1) A mobile communication apparatus, comprising:
a mobile communication unit configured to perform mobile communication in a mobile communication service; and
an authentication information providing unit configured to communicate authentication information comprising mobile subscriber information to a wireless LAN communication terminal separate from the mobile communication apparatus, and to further communicate with the wireless LAN communication terminal to allow the wireless LAN communication terminal to perform an authentication procedure using the authentication information to enable the wireless LAN communication terminal to connect to a network.

(E2) The apparatus of (E1), wherein the authentication information providing unit is further configured to receive from the wireless LAN communication terminal at least one communication the wireless LAN communication terminal received from a server.

(E3) The apparatus of (E2), in combination with the wireless LAN communication terminal and the server, and wherein the server comprises a RADIUS server.

(E4) The apparatus of (E3) or (E4), wherein the authentication information providing unit is further configured to communicate the subscriber information to the wireless LAN communication terminal in response to receiving an identity request as the least one communication the wireless LAN communication terminal received from the server.

(E5) The apparatus of any of (E1)-(E4), wherein the mobile subscriber information comprises an IMSI.

(E6) The apparatus of any of (E1)-(E5), wherein the authentication information further comprises a Nonce used for authentication of the network.

(E7) The apparatus of any of (E1)-(E6), wherein the authentication information further comprises a message authentication code.

(E8) The apparatus of any of (E1)-(E7), wherein the authentication procedure comprises an EAP-SIM authentication protocol.

(E9) The apparatus of any of (E1)-(E8), further comprising:
a power control unit configured to shift the mobile communication apparatus to a low power consumption mode after further communicating with the wireless LAN communication terminal to allow the wireless LAN communication terminal to perform the authentication procedure.

(E10) The apparatus of any of (E9), wherein the power control unit is further configured to receive and respond to an instruction from the wireless LAN communication terminal to shift to a low power consumption mode.

(E11) The apparatus of any of (E1)-(E10), further comprising:
a connection disabling processing unit configured to communicate a request to a control server to disable a connection of the wireless LAN communication terminal to the network in response to detecting a connection-disabling event.

(F1) A non-transient computer-readable medium having instructions encoded thereon which, when executed by at least one processor, cause the at least one processor to perform a method comprising acts of:
(a) causing the communication of authentication information comprising mobile subscriber information of a mobile communication terminal to a server, and
(b) further causing communication with the server to perform an authentication procedure to enable a wireless LAN communication terminal separate from the mobile communication terminal to connect to a network via wireless LAN communication with an access point separate from the mobile communication terminal.

(F2) The computer-readable medium of (F1), having further instructions encoded thereon which, when executed by the at least one processor, cause the at least one processor to cause the acts (a) and (b) to be performed by the wireless LAN communication terminal.

(F3) The computer-readable medium of (F2), having further instructions encoded thereon which, when executed by the at least one processor, cause the at least one processor to cause the wireless LAN communication terminal to receive and process the authentication information from the mobile communication terminal.

(F4) The computer-readable medium of (F1), having further instructions encoded thereon which, when executed by the at least one processor, cause the at least one processor to cause the wireless LAN communication terminal to receive and process an identity request from the access point, and to communicate the identity request to the mobile communication terminal.

(F5) The computer-readable medium of any of (F1)-(F4), having further instructions encoded thereon which, when executed by the at least one processor, cause the at least one processor to perform further act of:
in response to detecting the occurrence of a switching event, causing a communication mode of the wireless LAN communication terminal to switch between a first mode in which the wireless LAN communication terminal communicates with the network via wireless LAN communication with the access point and a second mode in which the wireless LAN communication terminal communicates with the network via a secondary network.

(F6) The computer-readable medium of (F5), wherein the secondary network comprises a mobile subscriber network to which the wireless LAN communication terminal is tethered.

(F7) The computer-readable medium of (F5) of (F6), having further instructions encoded thereon which, when executed by the at least one processor, cause the at least one processor to, perform a further act of:
switching comprises switching from the first mode to the second mode in response to detecting insufficient wireless LAN communication with the access point.

(F8) The computer-readable medium of (F5) of (F6), having further instructions encoded thereon which, when executed by the at least one processor, cause the at least one processor to, perform a further act of:
switching comprises switching from the second mode to the first mode in response to detecting sufficient wireless LAN communication with the access point.

(F9) The computer-readable medium of any of (F1)-(F8), wherein the mobile subscriber information comprises an IMSI.

(F10) The computer-readable medium of any of (F1)-(F9), wherein the authentication information further comprises a Nonce used for authentication of the network.

(F11) The computer-readable medium of any of (F1)-(F10), wherein the authentication information further comprises a message authentication code.

(F12) The computer-readable medium of any of (F1)-(F11), wherein the authentication procedure comprises an EAP-SIM authentication protocol.

(F13) The computer-readable medium of any of (F1)-(F12), having further instructions encoded thereon which, when executed by the at least one processor, cause the at least one processor to cause the wireless LAN communication terminal to perform a further act of:
after performing the acts (a) and (b), communicating an instruction to the mobile communication terminal to shift to a low power consumption mode.

(G1) A non-transient computer-readable medium having instructions encoded thereon which, when executed by at least one processor of a wireless LAN communication terminal, cause the wireless LAN communication terminal to perform a method comprising acts of:
receiving authentication information comprising mobile subscriber information from a mobile communication terminal; and
using the received authentication information to perform an authentication procedure to enable the wireless LAN communication terminal to connect to a network through wireless LAN communication with an access point.

(G2) The computer-readable medium of (G1), having further instructions encoded thereon which, when executed by the at least one processor, cause the at least one processor to cause the wireless LAN communication terminal to perform a further act of:
communicating the received authentication information to a server.

(G3) The computer-readable medium of (G1) or (G2), having further instructions encoded thereon which, when executed by the at least one processor, cause the at least one processor to cause the wireless LAN communication terminal to perform further acts of:
receiving an identity request from the access point; and
communicating the identity request to the mobile communication terminal.

(G4) The computer-readable medium of any of (G1)-(G4), having further instructions encoded thereon which, when executed by the at least one processor, cause the at least one processor to cause the wireless LAN communication terminal to perform a further act of:
in response to detecting the occurrence of a switching event, switching a communication mode of the wireless LAN communication terminal between a first mode in which the wireless LAN communication terminal communicates with the network via wireless LAN communication with the access point and a second mode in which the wireless LAN communication terminal communicates with the network via a secondary network.

(G5) The computer-readable medium of (G4), wherein the secondary network comprises a mobile subscriber network to which the wireless LAN communication terminal is tethered.

(G6) The computer-readable medium of (G4) or (G5), wherein the switching event comprises a detection of insufficient wireless LAN communication with the access point, and the act of switching comprises switching from the first mode to the second mode.

(G7) The computer-readable medium of (G4) or (G5), wherein the switching event comprises a detection of sufficient wireless LAN communication with the access point, and the act of switching comprises switching from the second mode to the first mode.

(G8) The computer-readable medium of any of (G1)-(G7), wherein the mobile subscriber information comprises an IMSI.

(G9) The computer-readable medium of any of (G1)-(G8), wherein the authentication information further comprises a Nonce used for authentication of the network.

(G10) The computer-readable medium of any of (G1)-(G9), wherein the authentication information further comprises a message authentication code.

(G11) The computer-readable medium of any of (G1)-(G10), wherein the authentication procedure comprises an EAP-SIM authentication protocol.

(G12) The computer-readable medium of any of (G1)-(G11), having further instructions encoded thereon which, when executed by the at least one processor, cause the at least one processor to cause the wireless LAN communication terminal to perform a further act of:
after using the received authentication information to perform the authentication procedure, shifting a communication mode for communication between the wireless LAN communication terminal and the mobile communication terminal to a low power consumption mode.

(G13) The computer-readable medium of any of (G1)-(G12), having further instructions encoded thereon which, when executed by the at least one processor, cause the at least one processor to cause the wireless LAN communication terminal to perform a further act of:
with the wireless LAN communication terminal, after using the received authentication information to perform the authentication procedure, communicating an instruction to the mobile communication terminal to shift to a low power consumption mode.

(H1) A non-transient computer-readable medium having instructions encoded thereon which, when executed by at least one processor of a mobile communication terminal, cause the mobile communication terminal to perform a method comprising acts of: communicating authentication information comprising mobile subscriber information to a wireless LAN communication terminal separate from the mobile communication terminal; and further communicating with the wireless LAN communication terminal to allow the wireless LAN communication terminal to perform an authentication procedure using the authentication information to enable the wireless LAN communication terminal to connect to a network.

(H2) The computer-readable medium of (H1), wherein the act of further communicating with the wireless LAN communication terminal comprises receiving from the wireless LAN communication terminal at least one communication the wireless LAN communication terminal received from a server.

(H3) The computer-readable medium of (H2), having further instructions encoded thereon which, when executed by the at least one processor, cause the at least one processor to cause the mobile communication terminal to perform a further act of: communicating the subscriber information from the mobile communication terminal to the wireless LAN communication terminal in response to receiving an identity request as the at least one communication the wireless LAN communication terminal received from the server.

(H4) The computer-readable medium of any of (H1)-(H3), wherein the mobile subscriber information comprises an IMSI.

(H5) The computer-readable medium of any of (H1)-(H4), wherein the authentication information further comprises a Nonce used for authentication of the network.

(H6) The computer-readable medium of any of (H1)-(H5), wherein the authentication information further comprises a message authentication code.

(H7) The computer-readable medium of any of (H1)-(H6), wherein the authentication procedure comprises an EAP-SIM authentication protocol.

(H8) The computer-readable medium of any of (H1)-(H7), having further instructions encoded thereon which, when executed by the at least one processor, cause the at least one processor to cause the mobile communication terminal to perform a further act of: after further communicating with the wireless LAN communication terminal to allow the wireless LAN communication terminal to perform the authentication procedure, shifting the mobile communication terminal to a low power consumption mode.

(H9) The computer-readable medium of any of (H1)-(H8), having further instructions encoded thereon which, when executed by the at least one processor, cause the at least one processor to cause the mobile communication terminal to perform a further act of: shifting the mobile communication terminal to a low power consumption mode in response to receiving an instruction from the wireless LAN communication terminal to shift to the low power consumption mode.

(H10) The computer-readable medium of any of (H1)-(H9), having further instructions encoded thereon which, when executed by the at least one processor, cause the at least one processor to cause the mobile communication terminal to perform a further act of: in response to detecting a connection-disabling event, communicating a request to a control server to disable a connection of the wireless LAN communication terminal to the network.

(I1) A terminal apparatus including:
an acquisition unit configured to acquire authentication information provided by a subscriber identity module of another terminal apparatus, the other terminal apparatus performing mobile communication in a mobile communication service; and an authentication processing unit configured to use the authentication information to perform an authentication procedure for connection to a network through wireless communication that is different from the mobile communication.

(I2) The terminal apparatus according to (I1), further including:
a connection control unit configured to control the terminal apparatus to connect to the network via the other terminal apparatus through the mobile communication, or to connect to the network through the wireless communication.

(I3) The terminal apparatus according to (I2),
wherein the connection control unit switches connection to the network through the mobile communication and connection to the network through the wireless communication in response to occurrence of a predetermined event.

(I4) The terminal apparatus according to (I3),
wherein the predetermined event includes an event in which an access point for the wireless communication is detected, and
wherein, when the access point has been detected, the connection control unit switches the connection to the network through the mobile communication to the connection to the network through the wireless communication.

(I5) The terminal apparatus according to (I3) or (I4),
wherein the predetermined event includes an event in which the terminal apparatus or the other terminal apparatus becomes incapable of communicating with the access point for the wireless communication, and
wherein, when the terminal apparatus or the other terminal apparatus has been incapable of communicating with the access point, the connection control unit switches the connection to the network through the wireless communication to the connection to the network through the mobile communication.

(I6) The terminal apparatus according to (I1), further including:
a power control unit configured to set a communication mode for communication between the terminal apparatus and the other terminal apparatus to a low power consumption mode while the authentication procedure is not being performed.

(I7) The terminal apparatus according to any one of (I1) to (I6),
wherein the wireless communication is wireless local area network (LAN) communication.

(I8) A program for causing a computer, which controls a terminal apparatus, to function as:
an acquisition unit configured to acquire authentication information provided by a subscriber identity module of another terminal apparatus, the other terminal apparatus performing mobile communication in a mobile communication service; and an authentication processing unit configured to use the authentication information to perform an authentication procedure for connection to a network through wireless communication that is different from the mobile communication.

(I9) A terminal apparatus including:
a mobile communication unit configured to perform mobile communication in a mobile communication service; and
a providing unit configured to provide authentication information to another terminal apparatus that uses the authentication information to perform an authentication procedure for connection to a network through wireless communication which is different from the mobile communication, the authentication information being provided by a subscriber identity module of the terminal apparatus.

(I10) The terminal apparatus according to (I9), wherein the other terminal apparatus connects to the network via the terminal apparatus through the mobile communication, or connects to the network through the wireless communication,
wherein the terminal apparatus further includes:
a connection control unit configured to cause the other terminal apparatus to switch connection to the network through the mobile communication and connection to the network through the wireless communication in response to occurrence of a predetermined event.

(I11) The terminal apparatus according to (I10), wherein the predetermined event includes an event in which an access point for the wireless communication is detected, and
wherein, when the access point has been detected, the connection control unit causes the other terminal apparatus to switch the connection to the network through the mobile communication to the connection to the network through the wireless communication.

(I12) The terminal apparatus according to (I10) or (I11), wherein the predetermined event includes an event in which the terminal apparatus or the other terminal apparatus becomes incapable of communicating with an access point for the wireless communication, and
wherein, when the terminal apparatus or the other terminal apparatus has been incapable of communicating with the access point, the connection control unit causes the other terminal apparatus to switch the connection to the network through the wireless communication to the connection to the network through the mobile communication.

(I13) The terminal apparatus according to (I9), further including:
a power control unit configured to set a communication mode for communication between the terminal apparatus and the other terminal apparatus to a low power consumption mode while the authentication procedure is not being performed.

(I14) The terminal apparatus according to (I9), further including:
a connection-disabling processing unit configured to perform a connection-disabling procedure for disabling connection of the other terminal apparatus to the network through the wireless communication in response to occurrence of a predetermined event.

(I15) The terminal apparatus according to (I14), wherein the connection-disabling procedure includes a procedure for requesting reconnection of the other terminal apparatus to the network through the wireless communication to be forbidden in addition to a procedure for requesting connection of the other terminal apparatus to the network through the wireless communication to be disabled.

(I16) The terminal apparatus according to (I14) or (I15), wherein the predetermined event includes an event in which the terminal apparatus and the other terminal apparatus become incapable of communicating with each other.

(I17) The terminal apparatus according to any one of (I14) to (I16),
wherein the predetermined event includes an event in which a predetermined user operation for performing the connection-disabling procedure is detected.

(I18) The terminal apparatus according to any one of (I9) to (I17),
wherein the wireless communication is wireless local area network (LAN) communication.

(I19) A program for causing a computer, which controls a terminal apparatus that performs mobile communication in a mobile communication service, to function as: a providing unit configured to provide authentication information to another terminal apparatus that uses the authentication information to perform an authentication procedure for connection to a network through wireless communication, the wireless communication being different from the mobile communication, the authentication information being provided by a subscriber identity module of the terminal apparatus.

(I20) A communication system including:
a first terminal apparatus; and
a second terminal apparatus,
wherein the first terminal apparatus includes a mobile communication unit that performs mobile communication in a mobile communication service, and a providing unit that provides authentication information to the second terminal apparatus, the authentication information being provided by a subscriber identity module of the first terminal apparatus, and
wherein the second terminal apparatus includes an acquisition unit that acquires the authentication information, and an authentication processing unit that uses the authentication information to perform an authentication procedure for connection to a network through wireless communication, the wireless communication being different from the mobile communication.

REFERENCE SIGNS LIST 1 communication system
30 network
31 access point (AP)
33 RADIUS server
40 mobile communication service provider network
41 base station (BS)
43 HLC/AuC server
100 wireless LAN communication terminal
110 wireless LAN communication unit
120 storage unit
130, 140, 150, 160 control unit
131 authentication information acquisition unit
133 authentication processing unit
141 switching event recognition unit
143, 151 connection control unit
161 power control unit
200 mobile communication terminal
220 wireless LAN communication unit
230 subscriber identity module (SIM)
240 storage unit
250, 260, 270, 280, 290 control unit
251 authentication information providing unit
261, 271 tethering control unit
273 switching event recognition unit
275 connection control unit
281 power control unit
291 connection-disabling processing unit

The invention claimed is:
1. A method, comprising:
in a wireless Local Area Network (LAN) communication terminal:
receiving an identity request from an access point;
communicating the identity request to a mobile communication terminal;

receiving authentication information from the mobile communication terminal based on the identity request;

communicating the authentication information comprising mobile subscriber information of the mobile communication terminal to a server; and communicating with the server based on the authentication information to enable the wireless LAN communication terminal, separate from the mobile communication terminal, to connect to a network, via wireless LAN communication, with the access point separate from the mobile communication terminal.

2. The method of claim 1, further comprising:
switching, based on detecting at least one switching event, a communication mode of the wireless LAN communication terminal between:
a first mode in which the wireless LAN communication terminal is configured to communicate with the network, via the wireless LAN communication, with the access point, and
a second mode in which the wireless LAN communication terminal is configured to communicate with the network via a secondary network.

3. The method of claim 2, wherein the secondary network comprises a mobile subscriber network, and
wherein the wireless LAN communication terminal is tethered to the mobile subscriber network.

4. The method of claim 2, wherein the at least one switching event comprises:
a first switching event comprising detection of insufficient wireless LAN communication with the access point, and
wherein the wireless LAN communication terminal is configured to switch from the first mode to the second mode based on a detection of the first switching event.

5. The method of claim 2, wherein the at least one switching event comprises:
a second switching event comprising detection of sufficient wireless LAN communication with the access point, and
wherein the wireless LAN communication terminal is configured to switch from the second mode to the first mode based on a detection of the second switching event.

6. The method of claim 1, wherein the authentication information further comprises at least one of an international mobile subscriber identity (IMSI), a Nonce used for authentication of the network, or a message authentication code.

7. The method of claim 1, wherein the server is a remote authentication dial in user service (RADIUS) server.

8. The method of claim 1, wherein an authentication procedure, to authenticate the wireless LAN communication terminal, comprises an extensible authentication protocol (EAP)-subscriber identity module (SIM) authentication protocol.

9. The method of claim 1, further comprising:
shifting a communication mode for communication between the wireless LAN communication terminal and the mobile communication terminal to a low power consumption mode.

10. The method of claim 9, wherein shifting the communication mode comprises shifting the mobile communication terminal to the low power consumption mode.

11. The method of claim 1, further comprising:
communicating an instruction to the mobile communication terminal to shift to a low power consumption mode.

12. The method of claim 1, further comprising:
communicating, based on detecting a connection-disabling event, via the mobile communication terminal, a request to a control server to disable the connection of the wireless LAN communication terminal to the network.

13. A wireless local area network (LAN) communication apparatus, comprising:
a central processing unit (CPU) and a memory storing instructions for execution by the CPU, the CPU configured to:
receive an identity request from an access point;
communicate the identity request to a mobile communication terminal;
receive authentication information comprising mobile subscriber information from the mobile communication terminal; and
communicate with a server, based on the authentication information, to enable the wireless LAN communication apparatus to connect to a network, via wireless LAN communication, with the access point.

14. The wireless LAN communication apparatus of claim 13, wherein the CPU is further configured to:
detect at least one switching event; and
switch a communication mode of the wireless LAN communication apparatus between:
a first mode in which the wireless LAN communication apparatus communicates with the network via the wireless LAN communication with the access point, and
a second mode in which the wireless LAN communication apparatus communicates with the network via a secondary network.

15. The wireless LAN communication apparatus of claim 14, wherein the secondary network comprises a mobile subscriber network to which the wireless LAN communication apparatus is tethered.

16. The wireless LAN communication apparatus of claim 14, wherein the CPU is further configured to switch from the first mode to the second mode based on a detection of an insufficient wireless LAN communication with the access point.

17. The wireless LAN communication apparatus of claim 14, wherein the CPU is further configured to switch from the second mode to the first mode based on a detection of a sufficient wireless LAN communication with the access point.

18. The wireless LAN communication apparatus of claim 13, wherein the authentication information further comprises at least one of an international mobile subscriber identity (IMSI), a Nonce used for authentication of the network, or a message authentication code.

19. The wireless LAN communication apparatus of claim 13, wherein an authentication procedure to authenticate the wireless LAN communication apparatus comprises an extensible authentication protocol (EAP)-subscriber identity module (SIM) authentication protocol.

20. The wireless LAN communication apparatus of claim 13, wherein the CPU is further configured to communicate an instruction to the mobile communication terminal to shift a communication mode for communication between the wireless LAN communication apparatus and the mobile communication terminal to a low power consumption mode after the CPU has used the received authentication information to authenticate the wireless LAN communication apparatus.

21. A mobile communication apparatus, comprising:
a central processing unit (CPU) and a memory storing instructions for execution by the CPU, the CPU configured to:
receive an identity request from a wireless Local Area Network (LAN) communication terminal, wherein the wireless LAN communication terminal receives the identity request from an access point; and
communicate authentication information comprising mobile subscriber information to the wireless LAN communication terminal, separate from the mobile communication apparatus, based on reception of the identity request,
wherein the wireless LAN communication terminal communicates with a server based on the authentication information to enable the wireless LAN communication terminal to connect to a network.

22. The mobile communication apparatus of claim 21, wherein the authentication information further comprises an international mobile subscriber identity (IMSI), a Nonce used for authentication of the network, or a message authentication code.

23. The mobile communication apparatus of claim 21, wherein an authentication procedure to authenticate the wireless LAN communication terminal comprises an extensible authentication protocol (EAP)-subscriber identity module (SIM) authentication protocol.

24. The mobile communication apparatus of claim 21, wherein the CPU is further configured to receive and respond to an instruction from the wireless LAN communication terminal to shift the mobile communication apparatus to a low power consumption mode after communication with the wireless LAN communication terminal to allow the wireless LAN communication terminal to authenticate the wireless LAN communication terminal.

25. The mobile communication apparatus of claim 21, wherein the CPU is further configured to communicate a request to a control server to disable the connection of the wireless LAN communication terminal to the network based on detection of a connection-disabling event.

26. A non-transitory computer-readable medium having stored thereon, computer-executable instructions which, when executed by at least one processor, cause the at least one processor to execute operations, the operations comprising:
receiving an identity request from an access point;
communicating the identity request to a mobile communication terminal;
receiving authentication information from the mobile communication terminal based on the identity request;
communicating the authentication information comprising mobile subscriber information of the mobile communication terminal to a server; and
communicating with the server based on the authentication information to enable the wireless LAN communication terminal, separate from the mobile communication terminal, to connect to a network via wireless LAN communication with the access point separate from the mobile communication terminal.

27. A non-transitory computer-readable medium having stored thereon, computer-executable instructions for causing a mobile communication terminal to execute operations, the operations comprising:
receiving an identity request from a wireless Local Area Network (LAN) communication terminal, wherein the wireless LAN communication terminal receives the identity request from an access point; and
communicating authentication information comprising mobile subscriber information to the wireless LAN communication terminal separate from the mobile communication terminal,
wherein the wireless LAN communication terminal communicates with a server based on the authentication information to enable the wireless LAN communication terminal to connect to a network.

\* \* \* \* \*